(12) United States Patent
Choi et al.

(10) Patent No.: US 10,302,456 B1
(45) Date of Patent: May 28, 2019

(54) POSITION SENSOR CONFIGURATION WITH BIAS FIELD OFFSET COMPENSATION

(71) Applicant: Apple Inc., Cupertino, CA (US)

(72) Inventors: Hyuk J. Choi, Pleasanton, CA (US); Jeffrey N. Gleason, San Francisco, CA (US); Yonghua Zhao, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 15/703,282

(22) Filed: Sep. 13, 2017

Related U.S. Application Data

(60) Provisional application No. 62/396,977, filed on Sep. 20, 2016.

(51) Int. Cl.
| | | |
|---|---|---|
| *G01B 7/00* | (2006.01) | |
| *G01D 5/14* | (2006.01) | |
| *H04N 5/232* | (2006.01) | |
| *G03B 13/36* | (2006.01) | |

(52) U.S. Cl.
CPC ............. *G01D 5/14* (2013.01); *G03B 13/36* (2013.01); *H04N 5/23258* (2013.01); *H04N 5/23287* (2013.01)

(58) Field of Classification Search
USPC ........................................ 324/207.11–207.15
See application file for complete search history.

(56) References Cited

U.S. PATENT DOCUMENTS

| | | |
|---|---|---|
| 5,841,275 A | 11/1998 | Spies |
| 8,446,147 B2 | 5/2013 | Chiba et al. |
| 2016/0148731 A1* | 5/2016 | Ausserlechner ..... G01R 33/022 324/207.11 |
| 2016/0231528 A1 | 8/2016 | Wong et al. |

* cited by examiner

*Primary Examiner* — Vincent Q Nguyen
(74) *Attorney, Agent, or Firm* — Robert C. Kowert; Meyertons, Hood, Kivlin, Kowert & Goetzel, P.C.

(57) ABSTRACT

Various embodiments include a position sensor configuration that compensates for a bias field offset. The position sensor configuration may be used for position sensing of components, such as camera components, that are movable via an actuator (e.g., a voice coil motor actuator). In some embodiments, the actuator may include an asymmetric magnet arrangement that produces an asymmetric magnetic field. The asymmetric magnetic field may include one or more bias field components that are offset relative to one or more axes. In some examples, the position sensor configuration may include one or more magnetic field sensor packages. Individual ones of the magnetic field sensor packages may include a magnetic field sensor and one or more compensation magnets. The compensation magnets may be configured to contribute to one or more compensation magnetic fields that counteract the bias field components such that the compensation magnetic fields compensate for the bias field offset.

20 Claims, 10 Drawing Sheets

POSITION SENSOR CONFIGURATION WITH BIAS FIELD OFFSET COMPENSATION

This application claims benefit of priority to U.S. Provisional Application No. 62/396,977, filed Sep. 20, 2016, titled "Position Sensor Configuration with Bias Field Offset Compensation", which is hereby incorporated by reference in its entirety.

BACKGROUND

Technical Field

This disclosure relates generally to position measurement and more specifically to position measurement for managing the motion of camera components using a position sensor configuration that compensates for a bias field offset.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the x and/or y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (or the z axis) of the camera to refocus the camera.

In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation/disturbance by adjusting location of the optical lens on the X and/or Y axis in an attempt to compensate for unwanted motion of the lens. In such systems, knowledge of the position of the lens is useful.

SUMMARY OF EMBODIMENTS

Various embodiments disclosed herein include a position sensor configuration that compensates for a bias field offset. The position sensor configuration may be used for position sensing of components that are movable via an actuator. In some examples, the position sensor configuration may be used for position sensing of one or more camera components (e.g., an optical package) that are movable via a voice coil motor (VCM) actuator. In some embodiments, the position sensor configuration may include one or more magnetic field sensor packages. Individual ones of the magnetic field sensor packages may include a respective magnetic field sensor (e.g., a Hall sensor, a tunneling magnetoresistance (TMR) sensor, a giant magnetoresistance (GMR) sensor, etc.) and a respective set of one or more compensation magnets. The compensation magnets may be configured to contribute to one or more compensation magnetic fields that counteract a bias field component such that the compensation magnetic fields compensate for a bias field offset.

Some embodiments include a camera unit. The camera unit may include an optical package and an asymmetric magnet arrangement. In various embodiments, an "asymmetric magnet arrangement" may be a magnet arrangement that has one or fewer axes of symmetry with respect to a plane that is orthogonal to an optical axis. The optical package may include one or more lenses that define the optical axis. The asymmetric magnet arrangement may be configured to provide voice coil motor (VCM) actuation along the optical axis and/or along a plane that is orthogonal to the optical axis. In various examples, the asymmetric magnet arrangement may be configured to produce an asymmetric magnetic field.

In some embodiments, the camera unit may include position sensor magnets. For instance, the position sensor magnets may be coupled to the optical package. In some examples, the position sensor magnets may include a first position sensor magnet and a second position sensor magnet. Furthermore, the camera unit may include magnetic field sensor packages. In some examples, the magnetic field sensor packages may include a first magnetic field sensor package and a second magnetic field sensor package.

The first magnetic field sensor package may include a first magnetic field sensor (e.g., a Hall sensor, a TMR sensor, and/or a GMR sensor) and a first set of compensation magnets. The first magnetic field sensor may be configured to detect one or more magnetic field components to enable determination of a position, along the optical axis, of the optical package. The magnetic field components may include at least one magnetic field component produced by the first position sensor magnet. The first set of compensation magnets may be configured to contribute to one or more compensation magnetic fields. In various embodiments, the compensation magnetic fields counteract a first bias field component that is offset relative to a first axis that is orthogonal to the optical axis. For instance, the first bias field component may be offset relative to the first axis based on the asymmetric magnetic field of the asymmetric magnet arrangement.

In some embodiments, the first magnetic field sensor may have a first elongated shape with a first long dimension that is longer than other dimensions of the first magnetic field sensor. The first magnetic field sensor may be oriented such that the first long dimension is parallel to the first axis relative to which the first bias field component may be offset.

The second magnetic field sensor package may include a second magnetic field sensor (e.g., a Hall sensor, a TMR sensor, and/or a GMR sensor) and a second set of compensation magnets. The second magnetic field sensor may be configured to detect one or more magnetic field components to enable determination of a position, along the optical axis, of the optical package. The magnetic field components may include at least one magnetic field component produced by the second position sensor magnet. The second set of compensation magnets may be configured to contribute to one or more compensation magnetic fields. In various embodiments, the compensation magnetic fields counteract a second bias field component that is offset relative to a second axis that is orthogonal to the optical axis. For instance, the second bias field component may be offset relative to the second axis based on the asymmetric magnetic field of the asymmetric magnet arrangement.

In some embodiments, the second magnetic field sensor may have a second elongated shape with a second long dimension that is longer than other dimensions of the second magnetic field sensor. The second magnetic field sensor may be oriented such that the second long dimension is parallel to the second axis relative to which the second bias field component may be offset.

Furthermore, in some examples, the first magnetic field sensor and the second magnetic field sensor may be oriented such that the first long dimension of the first magnetic field sensor is parallel to the second long dimension of the second magnetic field sensor.

Some embodiments include a mobile device (e.g., a mobile multifunction device). The mobile device may include one or more actuator magnets for voice coil motor (VCM) actuation of a movable member along a first axis and/or along a plane that is orthogonal to the first axis. The actuator magnets may produce an asymmetric magnetic field. In some embodiments, the actuator magnets form an asymmetric magnet arrangement that produces an asymmetric magnetic field.

In various examples, the actuator magnets may be part of a VCM actuator of a camera unit (also referred to herein as a "camera module") of the mobile device. The VCM actuator may further include one or more coils (e.g., one or more optical image stabilization coils and/or one or more autofocus coils) configured to magnetically interact with the actuator magnets to provide optical image stabilization and/or focusing. The camera module may include an optical package. In some examples, the optical package may be attached to the movable member. The optical package may include one or more lenses that define an optical axis. The optical axis may be the first axis along which the movable member is moved via the VCM actuator (e.g., to provide autofocus functionality).

In various embodiments, the mobile device may include position sensor magnets and magnetic field sensor packages. The position sensor magnets may be coupled to the movable member such that the position sensor magnets move along with the movable member and/or the optical package. Individual ones of the magnetic field sensor packages may include a respective magnetic field sensor (e.g., a Hall sensor, a TMR sensor, and/or a GMR sensor) and a respective set of one or more compensation magnets. The respective magnetic field sensor may be configured to detect one or more magnetic field components to enable determination of a position, along the first axis, of the movable member. The magnetic field components that may be detected by the respective magnetic field sensor may include at least one magnetic field component produced by at least one of the position sensor magnets. The respective set of one or more compensation magnets may be configured to contribute to one or more compensation magnetic fields that counteract a respective bias field component. The respective bias field component may be offset relative to a second axis that is orthogonal to the first axis. For instance, the respective bias field component may be offset relative to the second axis based on the asymmetric magnetic field of the actuator magnet(s).

Some embodiments include a system having an optical package, a voice coil motor (VCM) actuator for moving the optical package, position sensor magnets, and magnetic field sensor packages. In some examples, the magnetic field sensor packages of the system may be configured similar to, or identical to, the magnetic field sensor packages of the camera unit described above and/or the magnetic field sensor packages of the mobile device described above.

The optical package may include one or more lenses that define an optical axis. The VCM actuator may include a magnet arrangement for actuation along the optical axis and/or along a plane that is orthogonal to the optical axis. In various examples, the magnet arrangement may be an asymmetric magnet arrangement. Additionally, or alternatively, the magnet arrangement may be configured to produce an asymmetric magnetic field.

According to some examples, the position sensor magnets may be coupled to the optical package. The position sensor magnets may include a first position sensor magnet and a second position. Furthermore, the magnetic field sensor packages may include a first magnetic field sensor package and a second magnetic field sensor package. In some instances, the first magnetic field sensor package may be disposed proximate the first position sensor magnet, and the second magnetic field sensor package may be disposed proximate the second position sensor magnet. The first magnetic field sensor package may include a first magnetic field sensor (e.g., a Hall sensor, a TMR sensor, and/or a GMR sensor) configured to detect one or more magnetic field components including at least one magnetic field component produced by the first position sensor magnet. Similarly, the second magnetic field sensor package may include a second magnetic field sensor (e.g., a Hall sensor, a TMR sensor, and/or a GMR sensor) configured to detect one or more magnetic field components including at least one magnetic field component produced by the second position sensor magnet.

In various embodiments, individual ones of the magnetic field sensor packages may include a respective magnetic field sensor and a respective set of one or more compensation magnets. The respective set of one or more compensation magnets may be configured to contribute to one or more compensation magnetic fields that counteract a respective bias field component that is offset relative to an axis that is orthogonal to the optical axis. For instance, the respective bias field component may be offset relative to the axis based on the asymmetric magnetic field of the VCM actuator.

In some examples, the VCM actuator may include one or more autofocus coils and/or one or more optical image stabilization coils. The autofocus coils may provide actuation along the optical axis via magnetic interaction with one or more magnets of the magnet arrangement. The optical image stabilization coils may provide actuation along the plane that is orthogonal to the optical axis via magnetic interaction with one or more magnets of the magnet arrangement.

In some embodiments, the system may include one or more processors and memory. The memory may include program instructions that, when executed by the processors, cause the processors to perform operations. In some implementations, the operations may include determining a first signal detected at a first magnetic field sensor of a first magnetic field sensor package. For instance, the first signal may be based at least in part on one or more magnetic fields produced by the first position sensor magnet. Furthermore, the operations may include determining a second signal detected at a second magnetic field sensor of a second elongate magnetic field sensor package. For instance, the second signal may be based at least in part on one or more magnetic fields produced by the second position sensor magnet. In various examples, the operations may include calculating a first position of the optical package based at least in part on the first signal and the second signal. Furthermore, the operations may include determining an adjustment to at least one of a voltage and/or a current supplied to one or more of the autofocus coils to cause the optical package to move to a second position that is different than the first position. For instance, the adjustment to the voltage and/or current may be determined based at least in part on the first position.

Some implementations include a method of manufacturing a magnetic field sensor package that compensates for a bias field offset. The method may include forming and/or providing an elongate magnetic field sensor. Furthermore, the method may include coupling one or more magnets (also referred to herein as "compensation magnets") to a first side of the magnetic field sensor. Furthermore, the method may include coupling one or more magnets (also referred to herein as "compensation magnets") to a second side of the magnetic field sensor. In some embodiments, the magnetic field sensor and/or the compensation magnets may be manufactured using photochemical etching processes. In some implementations, the compensation magnets may be at least partially embedded within the magnetic field sensor.

Figure 1:
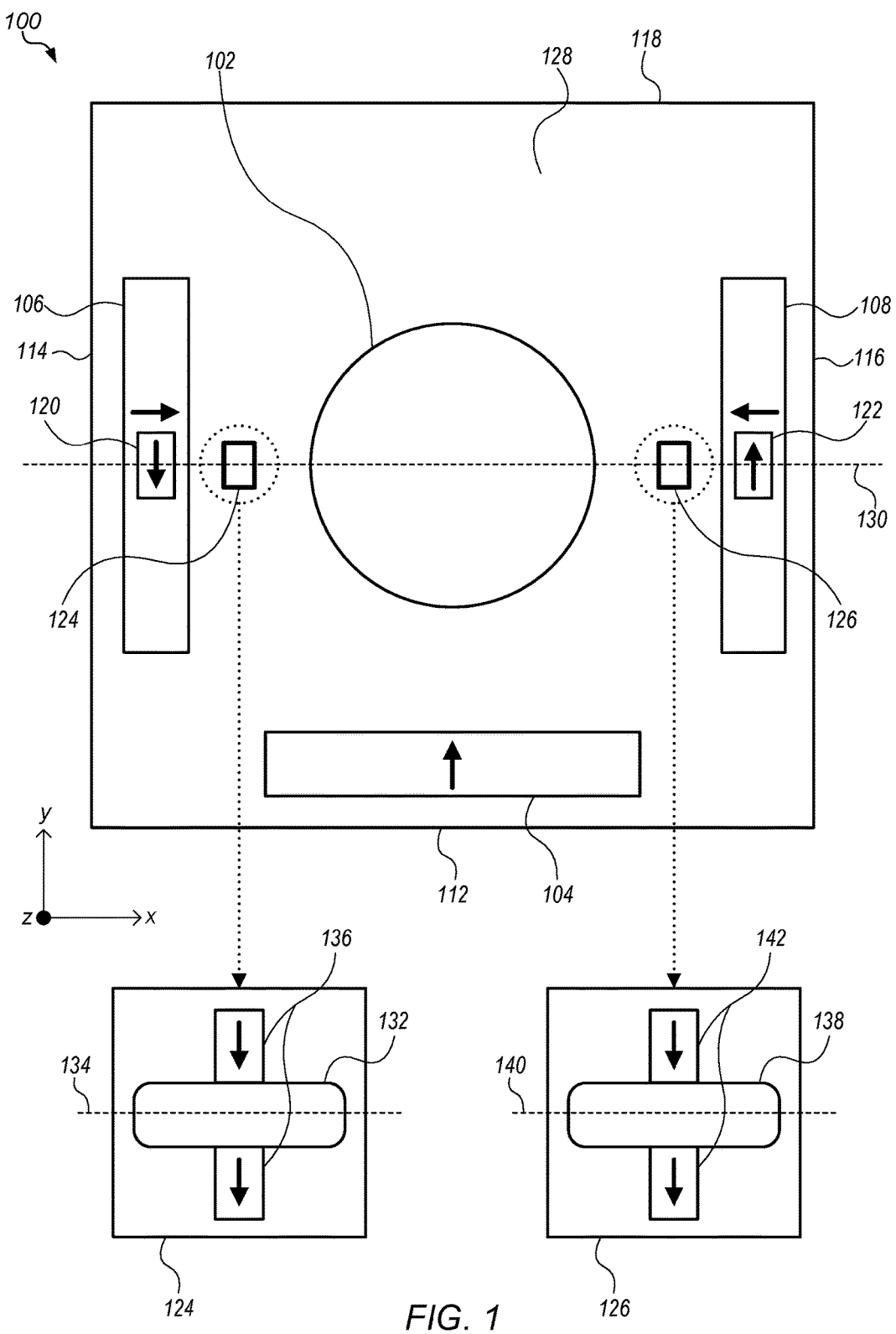
FIG. 1 illustrates a schematic top view of an example camera unit that includes an example position sensor configuration that compensates for a bias field offset, in accordance with some embodiments. The example camera unit of FIG. 1 includes an example voice coil motor (VCM) actuator that may have an asymmetric magnet arrangement that contributes to the bias field offset, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments disclosed herein include a position sensor configuration that compensates for a bias field offset. The position sensor configuration may be used for position sensing of components, such as camera components that are movable via an actuator. The actuator may deliver functions such as autofocus (AF) and/or optical image stabilization (OIS). One approach to delivering a very compact actuator for AF and/or OIS is to use a voice coil motor (VCM) actuator arrangement including one or more AF coils, one or more OIS coils, and/or one or more magnets. As current is applied to the coils, the magnetic fields generated interact with the magnetic fields of the magnets to generate forces that move at least a portion of the actuator in a desired manner.

In some examples, the magnetic fields generated by the coils and/or the magnetic fields of the magnets may produce an asymmetric magnetic field. In various embodiments, an "asymmetric magnet field" may be a magnetic field that has one or fewer axes of symmetry with respect to a plane that is orthogonal to an optical axis. The asymmetric magnetic field may include one or more bias field components that are offset relative to one or more axes. Such an offset is also referred to herein as a "bias field offset". A bias field offset that is detectable at a magnetic field sensor may be undesirable in some cases. For example, some position sensor configurations may include two magnetic field sensors for detecting magnetic field components at different locations of a camera module. Signals from both magnetic field sensors may be taken into account in position sensing. For instance, a signal from a first magnetic field sensor may be subtracted from a signal from a second magnetic field sensor to remove noise (e.g., fields that are external to the system, also referred to herein as "external fields"). Each magnetic field sensor may detect one or more magnetic field components produced by a respective position sensor magnet coupled to opposing sides of an optical package of the camera module. Furthermore, each magnetic field sensor may detect one or more magnetic field components from the VCM that include the bias field offset. To achieve complete external field rejection, for example, a first resultant magnetic field vector representing a combination of the magnetic field components detected at the first magnetic field sensor may be parallel to a second resultant magnetic field vector representing a combination of the magnetic field components detected at the second magnetic field sensor. For example, to achieve complete external field rejection, the first magnetic field vector may be at or about 180 degrees relative to the second magnetic field vector. Additionally or alternatively, to achieve complete external field rejection, the first magnetic field vector may be equal and opposite to the second magnetic field vector. However, due to the bias field offset, the first magnetic field vector may be offset relative to the second magnetic field vector such that position sensing based on the signals from the first magnetic field sensor and the second magnetic field sensor leads to incomplete external field rejection. As such, embodiments disclosed herein provide position sensor configurations that compensate for the bias field offset.

In some embodiments, one or more position sensor magnets of the position sensor configuration may be coupled to a movable body (e.g., an optical package of a camera), and one or more magnetic field sensors (e.g., Hall sensors, tunneling magnetoresistance (TMR) sensor, giant magnetoresistance (GMR) sensor, etc.) may be used to determine a position of the position sensor magnets and/or the movable body. As a position sensor magnet moves with the movable body, the magnetic field component(s) detected by the magnetic field sensor may change, which in turn may alter one or more parameters (e.g., a voltage) detected across sense terminals of the magnetic field sensors. Some embodiments may allow the magnetic field sensor output voltage to be very well correlated to the position of the movable body, such that the sensor output can be used as a measure of position, and be used to feedback the position, and allow more accurate positioning. Using a VCM actuator, in some embodiments the forces generated may be substantially linear with applied current. Furthermore, the position of the movable body may be substantially proportional to the current applied to the coils.

In some examples, the position sensor configuration may include one or more magnetic field sensor packages. Individual ones of the magnetic field sensor packages may include a respective magnetic field sensor (e.g., a Hall sensor, a TMR sensor, a GMR sensor, etc.) and a respective set of one or more compensation magnets. The compensation magnets may be configured to contribute to one or more compensation magnetic fields that counteract a bias field component such that the compensation magnetic fields compensate for a bias field offset.

Some embodiments include a camera unit. The camera unit may include an optical package and an asymmetric magnet arrangement. In various embodiments, an "asymmetric magnet arrangement" may be a magnet arrangement that has one or fewer axes of symmetry with respect to a plane that is orthogonal to an optical axis. The optical package may include one or more lenses that define the optical axis. The asymmetric magnet arrangement may be configured to provide voice coil motor (VCM) actuation along the optical axis and/or along a plane that is orthogonal to the optical axis. In various examples, the asymmetric magnet arrangement may be configured to produce an asymmetric magnetic field.

In some embodiments, the camera unit may include position sensor magnets. For instance, the position sensor magnets may be coupled to the optical package. In some examples, the position sensor magnets may include a first position sensor magnet and a second position sensor magnet. Furthermore, the camera unit may include magnetic field sensor packages. In some examples, the magnetic field sensor packages may include a first magnetic field sensor package and a second magnetic field sensor package.

The first magnetic field sensor package may include a first magnetic field sensor (e.g., a Hall sensor, a TMR sensor, and/or a GMR sensor) and a first set of compensation magnets. The first magnetic field sensor may be configured to detect one or more magnetic field components to enable determination of a position, along the optical axis, of the first position sensor magnet and/or the optical package. The magnetic field components that are detected by the first magnetic field sensor may include at least one magnetic field component produced by the first position sensor magnet. The first set of compensation magnets may be configured to contribute to one or more compensation magnetic fields. In various embodiments, the compensation magnetic fields counteract a first bias field component that is offset relative to a first axis that is orthogonal to the optical axis. For instance, the first bias field component may be offset relative to the first axis based on the asymmetric magnetic field of the asymmetric magnet arrangement.

The second magnetic field sensor package may include a second magnetic field sensor (e.g., a Hall sensor, a TMR sensor, and/or a GMR sensor) and a second set of compensation magnets. The second magnetic field sensor may be configured to detect one or more magnetic field components to enable determination of a position, along the optical axis, of the second position sensor magnet and/or the optical package. The magnetic field components that are detected by the second magnetic field sensor may include at least one magnetic field component produced by the second position sensor magnet. The second set of compensation magnets may be configured to contribute to one or more compensation magnetic fields. In various embodiments, the compensation magnetic fields counteract a second bias field component that is offset relative to a second axis that is orthogonal to the optical axis. For instance, the second bias field component may be offset relative to the second axis based on the asymmetric magnetic field of the asymmetric magnet arrangement.

In some examples, the first bias field component may comprise a first magnetic flux vector at the first magnetic field sensor of the first magnetic field sensor package. Furthermore, the second bias field component may comprise a second magnetic flux vector at the second magnetic field sensor of the second magnetic field sensor package. A combination of the compensation magnetic fields of the first set of compensation magnets may comprise a third magnetic flux vector that may cancel out the first magnetic flux vector of the first bias field component at the first magnetic field sensor to remove the offset, relative to the first axis, of the first bias field component. Likewise, a combination of the compensation magnetic fields of the second set of compensation magnets may comprise a fourth magnetic flux vector that may cancel out the second magnetic flux vector of the second bias field component at the second elongate magnetic field sensor to remove the offset, relative to the second axis, of the second bias field component. In some examples, the first axis may be parallel to and/or coincident with the second axis. Furthermore, in some cases, the first magnetic flux vector of the first bias field component may be equal in magnitude to the second magnetic flux vector of the second bias field component.

In various embodiments, the first magnetic field sensor and/or the second magnetic field sensor may have an elongated shape. For instance, the first magnetic field sensor may have an elongated shape with a first long dimension that is longer than other dimensions of the first magnetic field sensor. Likewise, the second magnetic field sensor may have an elongated shape with a second long dimension that is longer than other dimensions of the second magnetic field sensor.

The first long dimension of the first magnetic field sensor may define a first longitudinal axis of the first magnetic field sensor. In some examples, the first longitudinal axis may be parallel to and/or coincident with the first axis. Accordingly, the first bias field component may be offset relative to the first longitudinal axis of the first magnetic field sensor, and the first set of compensation magnets may be configured to cancel out the offset. Furthermore, the first bias field component may include a first magnetic flux vector that points in a first direction. The first magnetic field sensor may be oriented such that the first long dimension extends along a second direction that is orthogonal to the first direction of the first bias field component. That is, the first longitudinal axis of the first magnetic field sensor may extend along the second direction that is orthogonal to the first direction of the first bias field component.

The second long dimension of the second magnetic field sensor may define a second longitudinal axis of the second magnetic field sensor. In some examples, the second longitudinal axis may be parallel to and/or coincident with the second axis. Accordingly, the second bias field component may be offset relative to the second longitudinal axis of the second magnetic field sensor, and the second set of compensation magnets may be configured to cancel out the offset. Furthermore, the second bias field component may include a second magnetic flux vector that points in a first direction. The second magnetic field sensor may be oriented such that the second long dimension extends along a second direction that is orthogonal to the first direction of the second bias field component. That is, the second longitudinal axis of the second magnetic field sensor may extend along the second direction that is orthogonal to the first direction of the second bias field component.

In some embodiments, the first set of compensation magnets of the first magnetic field sensor package may include a first compensation magnet and a second compensation magnet. The first compensation magnet may be coupled to a first side of the first magnetic field sensor. The second compensation magnet may be coupled to a second side of the first magnetic field sensor. The second side may be opposite the first side. In some examples, the first compensation magnet and the second compensation magnet may be coupled to opposing elongate sides of the first magnetic field sensor. For instance, when the first magnetic field sensor is formed to an elongated shape, the first magnetic field sensor may include a first elongate side that extends along the first long dimension, and a second elongate side that extends along the first long dimension and that is opposite the first elongate side. The first compensation magnet may be coupled to the first magnetic field sensor at, or proximate to, the first elongate side. The second compensation magnet may be coupled to the first magnetic field sensor at, or proximate to, the second elongate side.

In some embodiments, the second set of compensation magnets of the second magnetic field sensor package may include a first compensation magnet and a second compensation magnet. The first compensation magnet may be coupled to a first side of the second magnetic field sensor. The second compensation magnet may be coupled to a second side of the second magnetic field sensor. The second side may be opposite the first side. In some examples, the first compensation magnet and the second compensation magnet may be coupled to opposing elongate sides of the second magnetic field sensor. For instance, when the second magnetic field sensor is formed to an elongated shape, the second magnetic field sensor may include a first elongate side and a second elongate side that extend along the second long dimension. The first compensation magnet may be coupled to the second magnetic field sensor at, or proximate to, the first elongate side. The second compensation magnet may be coupled to the second magnetic field sensor at, or proximate to, the second elongate side.

In various embodiments, the asymmetric magnet arrangement may include one or multiple magnets. In some examples, the asymmetric magnet arrangement may produce an asymmetric magnetic field. For instance, the asymmetric magnetic field may include the first bias field component and/or the second bias field component. In some embodiments, the camera unit may be rectangular in plan, and the asymmetric magnet arrangement may include a first magnet, a second magnet, and a third magnet. The first magnet may be disposed proximate a first side of the camera unit. The second magnet may be disposed proximate a second side of the camera unit. The third magnet may be disposed proximate a third side of the camera unit that is opposite the second side of the camera unit. In various embodiments, no magnets are disposed proximate a fourth side of the camera unit that is opposite the first side of the camera unit. In some instances, the first magnet of the asymmetric magnet arrangement may have an elongate shape with a long dimension that is longer than other dimensions of the first magnet. The first long dimension of the first magnetic field sensor and/or the second long dimension of the second magnetic field sensor may be parallel to the long dimension of the first magnet of the asymmetric magnet arrangement. Additionally or alternatively, the first long dimension of the first magnetic field sensor and/or the second long dimension of the second magnetic field sensor may be orthogonal to the optical axis.

Some embodiments include a mobile device (e.g., a mobile multifunction device). The mobile device may include one or more actuator magnets for voice coil motor (VCM) actuation of a movable member along a first axis and/or along a plane that is orthogonal to the first axis. The actuator magnets may produce an asymmetric magnetic field. In some embodiments, the actuator magnets form an asymmetric magnet arrangement that produces an asymmetric magnetic field.

In various examples, the actuator magnets may be part of a VCM actuator of a camera unit (also referred to herein as a "camera module") of the mobile device. The VCM actuator may further include one or more coils (e.g., one or more optical image stabilization coils and/or one or more autofocus coils) configured to magnetically interact with the actuator magnets to provide optical image stabilization and/or focusing. The camera module may include an optical package. In some examples, the optical package may be attached to the movable member. The optical package may include one or more lenses that define an optical axis. The optical axis may be the first axis along which the movable member is moved via the VCM actuator (e.g., to provide autofocus functionality).

In various embodiments, the mobile device may include position sensor magnets and magnetic field sensor packages. In some examples, the magnetic field sensor packages of the mobile device may be configured similar to, or identical to, the magnetic field sensor packages of the camera unit described above and/or the magnetic field sensor packages of the system described below.

The position sensor magnets may be coupled to the movable member such that the position sensor magnets move along with the movable member and/or the optical package. Individual ones of the magnetic field sensor packages may include a respective magnetic field sensor (e.g., a Hall sensor, a TMR sensor, and/or a GMR sensor) and a respective set of one or more compensation magnets. The respective magnetic field sensor may be configured to detect one or more magnetic field components to enable determination of a position, along the first axis, of the movable member. The magnetic field components that may be detected by the respective magnetic field sensor may include at least one magnetic field component produced by at least one of the position sensor magnets. The respective set of one or more compensation magnets may be configured to contribute to one or more compensation magnetic fields that counteract a respective bias field component. The respective bias field component may be offset relative to a second axis that is orthogonal to the first axis. For instance, the respective bias field component may be offset relative to the second axis based on the asymmetric magnetic field of the actuator magnet(s).

In some embodiments, the one or more actuator magnets of the VCM actuator may comprise an asymmetric magnet arrangement. For example, the asymmetric magnet arrangement may include a first magnet, a second magnet, and a third magnet. The first magnet may be disposed proximate a first side of the movable member. The second magnet may be disposed proximate a second side of the movable member. The third magnet may be disposed proximate a third side of the movable member that is opposite the second side of the movable member. In various embodiments, no magnets are disposed proximate a fourth side of the movable member that is opposite the first side of the movable member.

In various embodiments, the mobile device may further include a plurality of coils. For example, the plurality of coils may include one or more autofocus coils and/or one or more optical image stabilization coils. The one or more autofocus coils may interact with the one or more actuator magnets to provide VCM actuation along the first axis for autofocus purposes. The one or more optical image stabilization coils may interact with the one or more actuator magnets to provide VCM actuation along a plane that is orthogonal to the first axis for optical image stabilization purposes. In some embodiments, the plurality of coils may be individually configured to receive a respective flow of current that interacts with at least one of the actuator magnets for VCM actuation along the first axis and/or along the plane that is orthogonal to the first axis.

In some examples, the mobile device may include an optical package of a camera module. The optical package may be coupled to the movable member. For instance, the optical package may be disposed proximate a top side of the movable member. Furthermore, the mobile device may include a base structure disposed proximate a bottom side of the movable member that is opposite the top side of the moving member. The movable member may be configured to move relative to the base structure in response to VCM actuation.

In some embodiments, the position sensor magnets may include a first position sensor magnet and a second position sensor magnet. The first position sensor magnet may be disposed proximate the second side of the movable member (e.g., near the second magnet that is disposed proximate the second side of the movable member). The second position sensor magnet may be disposed proximate the third side of the movable member (e.g., near the third magnet that is disposed proximate the third side of the movable member) that is opposite the second side of the movable member.

In some embodiments, the magnetic field sensor packages may include a first magnetic field sensor package and a second magnetic field sensor package. The first magnetic field sensor package may be coupled to the base structure and/or disposed proximate the first position sensor magnet. The second magnetic field sensor package may be coupled to the base structure and/or disposed proximate the second position sensor magnet.

Some embodiments include a system having an optical package, a voice coil motor (VCM) actuator for moving the optical package, position sensor magnets, and magnetic field sensor packages. In some examples, the magnetic field sensor packages of the system may be configured similar to, or identical to, the magnetic field sensor packages of the camera unit described above and/or the magnetic field sensor packages of the mobile device described above.

The optical package may include one or more lenses that define an optical axis. The VCM actuator may include a magnet arrangement for actuation along the optical axis and/or along a plane that is orthogonal to the optical axis. In various examples, the magnet arrangement may be an asymmetric magnet arrangement. Additionally, or alternatively, the magnet arrangement may be configured to produce an asymmetric magnetic field.

According to some examples, the position sensor magnets may be coupled to the optical package. The position sensor magnets may include a first position sensor magnet and a second position. Furthermore, the magnetic field sensor packages may include a first magnetic field sensor package and a second magnetic field sensor package. In some instances, the first magnetic field sensor package may be disposed proximate the first position sensor magnet, and the second magnetic field sensor package may be disposed proximate the second position sensor magnet. The first magnetic field sensor package may include a first magnetic field sensor (e.g., a Hall sensor, a TMR sensor, and/or a GMR sensor) configured to detect one or more magnetic field components including at least one magnetic field component produced by the first position sensor magnet. Similarly, the second magnetic field sensor package may include a second magnetic field sensor (e.g., a Hall sensor, a TMR sensor, and/or a GMR sensor) configured to detect one or more magnetic field components including at least one magnetic field component produced by the second position sensor magnet.

In various embodiments, individual ones of the magnetic field sensor packages may include a respective magnetic field sensor and a respective set of one or more compensation magnets. The respective set of one or more compensation magnets may be configured to contribute to one or more compensation magnetic fields that counteract a respective bias field component that is offset relative to an axis that is orthogonal to the optical axis. For instance, the respective bias field component may be offset relative to the axis based on the asymmetric magnetic field of the VCM actuator.

In some examples, the VCM actuator may include one or more autofocus coils and/or one or more optical image stabilization coils. The autofocus coils may provide actuation along the optical axis via magnetic interaction with one or more magnets of the magnet arrangement. The optical image stabilization coils may provide actuation along the plane that is orthogonal to the optical axis via magnetic interaction with one or more magnets of the magnet arrangement.

In some embodiments, the system may include one or more processors and memory. The memory may include program instructions that, when executed by the processors, cause the processors to perform operations. In some implementations, the operations may include determining a first signal detected at a first magnetic field sensor of a first magnetic field sensor package. For instance, the first signal may be based at least in part on one or more magnetic fields produced by the first position sensor magnet. Furthermore, the operations may include determining a second signal detected at a second magnetic field sensor of a second elongate magnetic field sensor package. For instance, the second signal may be based at least in part on one or more magnetic fields produced by the second position sensor magnet. In various examples, the operations may include calculating a first position of the optical package based at least in part on the first signal and the second signal. Furthermore, the operations may include determining an adjustment to at least one of a voltage and/or a current supplied to one or more of the autofocus coils to cause the optical package to move to a second position that is different than the first position. For instance, the adjustment to the voltage and/or current may be determined based at least in part on the first position.

Some implementations include a method of manufacturing a magnetic field sensor package that compensates for a bias field offset. The method may include forming and/or providing an elongate magnetic field sensor. Furthermore, the method may include coupling one or more magnets (also referred to herein as "compensation magnets") to a first side of the magnetic field sensor. Furthermore, the method may include coupling one or more magnets (also referred to herein as "compensation magnets") to a second side of the magnetic field sensor. In some embodiments, the magnetic field sensor and/or the compensation magnets may be manufactured using photochemical etching processes. In some implementations, the compensation magnets may be at least partially embedded within the magnetic field sensor.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a schematic top view of an example camera unit 100 that includes an example position sensor configuration that compensates for a bias field offset, in accordance with some embodiments. The camera unit 100 includes an example voice coil motor (VCM) actuator that has an asymmetric magnet arrangement that contributes to the bias field offset, in accordance with some embodiments. Although not shown in FIG. 1, the VCM actuator may include one or more coils (e.g., one or more optical image stabilization coils and/or one or more autofocus coils) configured to magnetically interact with magnets of the asymmetric magnet arrangement to provide optical image stabilization and/or focusing. The coils, and some other components of the camera unit 100 and/or the VCM actuator that are not shown in FIG. 1, are discussed below with reference to FIGS. 2 and 3.

The camera unit 100 may include an optical package 102 and an asymmetric magnet arrangement. The optical package 102 may include one or more lenses (not shown) that define an optical axis. In some examples, the optical axis may be substantially parallel to the z axis of the coordinate system illustrated in FIG. 1. The asymmetric magnet arrangement may be configured to provide voice coil motor (VCM) actuation along the optical axis and/or along a plane that is orthogonal to the optical axis. In some examples, the plane that is orthogonal to the optical axis may be parallel to the x-y plane.

In various embodiments, the asymmetric magnet arrangement may include one or multiple magnets. For instance, the asymmetric magnet arrangement may include a first magnet 104 (e.g., a lateral position control magnet, as discussed in further detail below with reference to FIG. 2), a second magnet 106 (e.g., a transverse position control magnet, as discussed in further detail below with reference to FIG. 2), and a third magnet 108 (e.g., a transverse position control magnet, as discussed in further detail below with reference to FIG. 2). In some examples, the asymmetric magnet arrangement may produce an asymmetric magnetic field. For example, the arrows depicted in the magnets 104, 106, and 108 indicate predominant field directions of the magnetic fields produced by the magnets 104, 106, and 108. As in the illustrated example, the first magnet 104 may produce one or more magnetic fields that predominantly point in the positive y direction. The second magnet 106 may produce one or more magnetic fields that predominantly point in the positive x direction. The third magnet 108 may include one or more magnetic fields that predominantly point in the negative x direction. That is, the second magnet 106 and the third magnet 108 may produce magnetic fields that counteract one another, whereas the first magnet 102 may produce one or more magnetic fields that are not counteracted by magnets of the asymmetric magnet arrangement. Accordingly, the asymmetric magnet arrangement may produce an asymmetric magnetic field that is biased in the positive y direction. In other words, in some cases, the asymmetric magnetic field may include a bias field that is offset relative to the x axis.

In some embodiments, the camera unit 100 may be rectangular in plan. The first magnet 104 may be disposed proximate a first side 112 of the camera unit 100. The second magnet 106 may be disposed proximate a second side 114 of the camera unit 100. The third magnet 108 may be disposed proximate a third side 116 of the camera unit 100 that is opposite the second side 114 of the camera unit 100. In various embodiments, no magnets are disposed proximate a fourth side 118 of the camera unit 100 that is opposite the first side 112 of the camera unit 100.

In some embodiments, the camera unit 100 may include one or more position sensor magnets. For instance, the position sensor magnets may be attached to the optical package 102. In some examples, the position sensor magnets may include a first position sensor magnet 120 and a second position sensor magnet 122.

In some examples, the first position sensor magnet 120 and the second position sensor magnet 122 may be coupled to the optical package 102. For instance, as discussed in further detail below with reference to FIG. 2, the first position sensor magnet 120 and the second position sensor magnet 122 may be coupled to the optical package 102 via one or more autofocus coils (e.g., autofocus coil 216 illustrated in FIG. 2) and/or a lens carrier (e.g., lens carrier 214 illustrated in FIG. 2). As such, the first position sensor magnet 120 and the second position sensor magnet 122 may be configured to move along with the optical package 102.

Furthermore, the camera unit 100 may include a position sensor configuration that includes one or more magnetic field sensor packages. In some examples, the magnetic field sensor packages may include a first magnetic field sensor package 124 and a second magnetic field sensor package 126. The first magnetic field sensor package 124 and the second magnetic field sensor package 126 may be attached to a base structure 128 of the camera unit 100. The optical package 102 and the position sensor magnets 120 and 122 may be configured to move relative to the base structure 128, e.g., via VCM actuation.

In some embodiments, the first magnetic field sensor package 124 may be disposed proximate the first position sensor magnet 120 such that a magnetic field sensor of the first magnetic field sensor package 124 is capable of detecting one or more magnetic field components produced by the first position sensor magnet 120. For instance, the first magnetic field sensor package 124 and the first position sensor magnet 120 may be situated at, or proximate to, a first side and/or portion of the optical package 102. The second magnetic field sensor package 126 may be disposed proximate the second position sensor magnet 122 such that a magnetic field sensor of the second magnetic field package 126 is capable of detecting one or more magnetic field components produced by the second position sensor magnet 122. For instance, the second magnetic field sensor package 126 and the second position sensor magnet 122 may be situated at, or proximate to, a second side and/or portion of the optical package 102. The second side of the optical package 102 may be opposite the first side of the optical package 102. Although FIG. 1 shows an example arrangement of position sensor magnets and magnetic field sensor packages, a person of ordinary skill in the art would understand that other arrangements of position sensor magnets and magnetic field sensor packages that are suitable for position sensing fall within the scope of this disclosure. For example, the position sensors and/or the magnetic field sensor packages may be positioned relative to one another differently than in the example arrangement shown in FIG. 1.

In some embodiments, the first position sensor magnet 120 may contribute to one or more magnetic field components that have a predominant field direction pointing in a first direction, e.g., in the negative y direction as indicated by the arrow depicted in the first position sensor magnet 120. Furthermore, the second position sensor magnet 122 may contribute to one or more magnetic field components that have a predominant field direction pointing in a second direction that is opposite the first direction, e.g., in the positive y direction as indicated by the arrow depicted in the second position sensor magnet 122. In various embodiments, the magnetic field sensors of the magnetic field sensor packages 124, 126 and the position sensor magnets 120, 122 may be configured such that movement of the optical package 102 affects the signals produced by the magnetic field sensors differently. For example, due to the opposing predominant field directions of the position sensor magnets 120, 122, a magnetic field sensor of the first magnetic field sensor package 124 may detect a first autofocus-related magnetic field component (e.g., from the first position sensor magnet 120) and a magnetic field sensor of the second magnetic field sensor package 126 may detect a second autofocus-related magnetic field component (e.g., from the second position sensor magnet 122), as the optical package 102 moves along the optical axis. The second autofocus-related magnetic field component may be opposite the first autofocus-related magnetic field component.

In some examples, the first magnetic field sensor package 124 and/or the second magnetic field sensor package 126 may be aligned along an axis 130 that is parallel to the x axis, and orthogonal to the optical axis 102 and/or the z axis. The first magnetic field sensor package 124 may include a first magnetic field sensor 132 (e.g., a Hall sensor, a tunneling magnetoresistance (TMR) sensor, and/or a giant magnetoresistance (GMR) sensor) and a first set of compensation magnets 136 (e.g., one or more hard magnets). As discussed in further detail below with reference to FIGS. 5 and 7, the first set of compensation magnets 136 may be coupled to the first magnetic field sensor 132. The first magnetic field sensor 132 may define a first longitudinal axis 134. In some examples, the first longitudinal axis 134 may be parallel to and/or coincident with the axis 130. Furthermore, the first magnetic field sensor 132 may be configured to detect one or more magnetic field components to enable determination of a position, along the optical axis, of the first position sensor magnet 120 and/or the optical package 102. The magnetic field components may include at least one magnetic field component produced by the first position sensor magnet 120. The first set of compensation magnets 136 may be configured to contribute to one or more compensation magnetic fields. In various embodiments, the compensation magnetic fields counteract a first bias field component that is offset relative to the first longitudinal axis 134 and/or the axis 130. In some cases, the first bias field component may be offset relative to the first longitudinal axis 134 and/or the axis 130 based on the asymmetric magnetic field. For example, as indicated by the arrows depicted in the first set of compensation magnets 136, the first set of compensation magnets 136 may contribute to one or more compensation magnetic field components that have a predominant field direction pointing in the negative y direction. As such, the first set of compensation magnets 136 may counteract a first bias field component that points in the positive y direction at the first magnetic field sensor 132 based on the asymmetric magnet arrangement.

The second magnetic field sensor package 126 may include a second magnetic field sensor 138 (e.g., a Hall sensor, a tunneling magnetoresistance (TMR) sensor, and/or a giant magnetoresistance (GMR) sensor) and a second set of compensation magnets 142 (e.g., one or more hard magnets). As discussed in further detail below with reference to FIGS. 5 and 7, the second set of compensation magnets 142 may be coupled to the second magnetic field sensor 138. The second magnetic field sensor 138 may define a second longitudinal axis 140. In some examples, the second longitudinal axis 140 may be parallel to and/or coincident with the axis 130, the first longitudinal axis 134, or both. Furthermore, the second magnetic field sensor 138 may be configured to detect one or more magnetic field components to enable determination of a position, along the optical axis, of the second position sensor magnet 122 and/or the optical package 102. The magnetic field components may include at least one magnetic field component produced by the second position sensor magnet 122. The second set of compensation magnets 142 may be configured to contribute to one or more compensation magnetic fields. In various embodiments, the compensation magnetic fields counteract a second bias field component that is offset relative to the second longitudinal axis 140 and/or the axis 130. In some cases, the second bias field component may be offset relative to the second longitudinal axis 140 and/or the axis 130 based on the asymmetric magnetic field. For example, as indicated by the arrows depicted in the second set of compensation magnets 142, the second set of compensation magnets 142 may contribute to one or more compensation magnetic field components that have a predominant field direction pointing in the negative y direction. As such, the second set of compensation magnets 142 may counteract a second bias field component that points in the positive y direction at the second magnetic field sensor 138 based on the asymmetric magnet arrangement.

In some examples, the first bias field component may comprise a first magnetic flux vector at the first magnetic field sensor 132 of the first magnetic field sensor package 124. Furthermore, the second bias field component may comprise a second magnetic flux vector at the second magnetic field sensor 138 of the second magnetic field sensor package 126. A combination of the compensation magnetic fields of the first set of compensation magnets 136 may comprise a third magnetic flux vector that may cancel out the first magnetic flux vector at the first magnetic field sensor 132 to remove the bias field offset. Likewise, a combination of the compensation magnetic fields of the second set of compensation magnets 142 may comprise a fourth magnetic flux vector that may cancel out the second magnetic flux vector at the second magnetic field sensor 138 to remove the bias field offset.

In various embodiments, the first magnetic field sensor 132 and/or the second magnetic field sensor 138 may have an elongated shape. For instance, the first magnetic field sensor 132 may have an elongated shape with a first long dimension that is longer than other dimensions of the first magnetic field sensor. Likewise, the second magnetic field sensor 138 may have an elongated shape with a second long dimension that is longer than other dimensions of the second magnetic field sensor.

The first long dimension of the first magnetic field sensor 132 may define the first longitudinal axis 134 of the first magnetic field sensor 132. In some examples, the first longitudinal axis 134 may be parallel to and/or coincident with the axis 130. Furthermore, the first bias field component may include a first magnetic flux vector that points in a first direction. The first magnetic field sensor 132 may be oriented such that the first long dimension extends along a second direction that is orthogonal to the first direction of the first bias field component. That is, the first longitudinal axis 134 of the first magnetic field sensor 132 may extend along the second direction that is orthogonal to the first direction of the first bias field component.

The second long dimension of the second magnetic field sensor 138 may define the second longitudinal axis 140 of the second magnetic field sensor 138. In some examples, the second longitudinal axis 140 may be parallel to and/or coincident with the axis 130. Furthermore, the second bias field component may include a second magnetic flux vector that points in a first direction. The second magnetic field sensor 138 may be oriented such that the second long dimension extends along a second direction that is orthogonal to the first direction of the second bias field component. That is, the second longitudinal axis 140 of the second magnetic field sensor 138 may extend along the second direction that is orthogonal to the first direction of the second bias field component.

Figure 2:
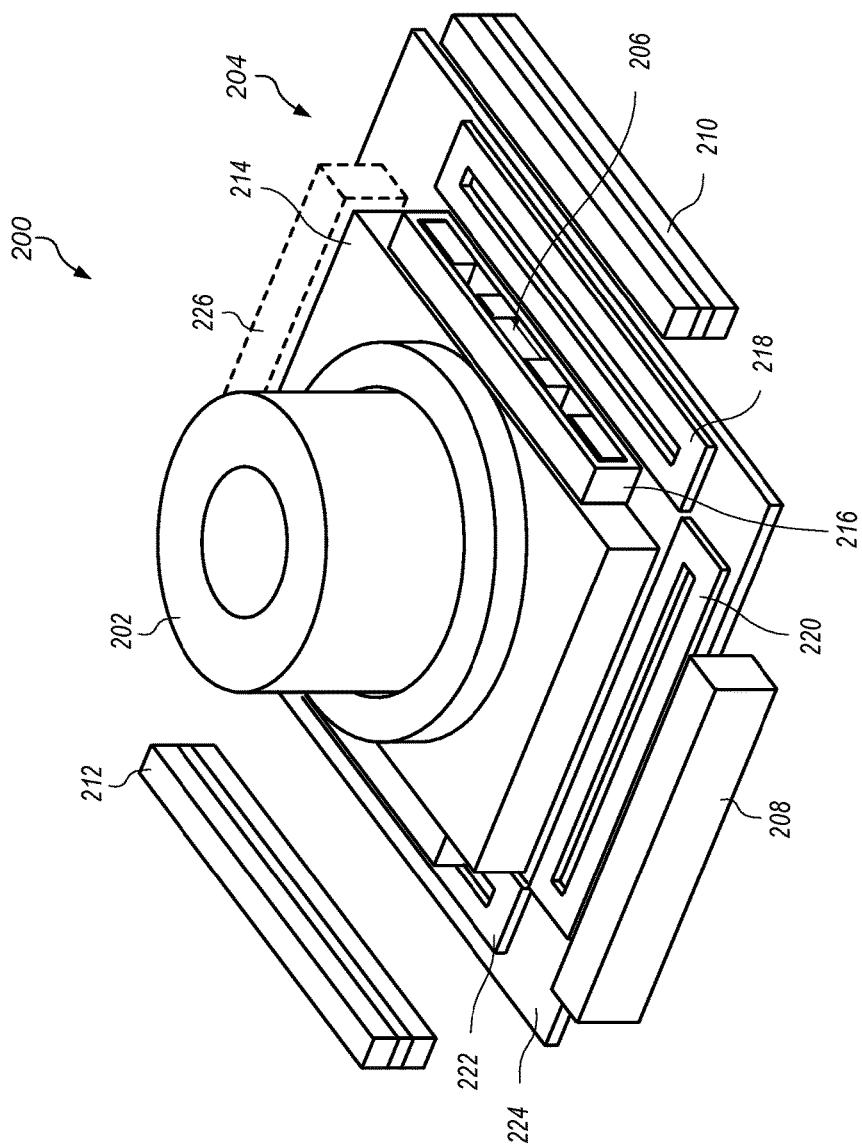
FIG. 2 illustrates a perspective view of an example camera module having an example VCM actuator for moving an optical package, in accordance with some embodiments. The example VCM actuator of FIG. 2 may include an asymmetric magnet arrangement that produces an asymmetric magnetic field that contributes to a bias field offset, in accordance with some embodiments.

FIG. 2 illustrates a perspective view of an example camera module 200 having an example VCM actuator for moving an optical package, in accordance with some embodiments. The example VCM actuator of FIG. 2 includes an asymmetric magnet arrangement that produces an asymmetric magnetic field that contributes to a bias field offset, in accordance with some embodiments. The camera module 200 may include an optical package (e.g., including a tele-lens) 202 and an actuator 204 for moving the optical package 202. In some embodiments, a plurality of position sensor magnets 206 may be attached to the optical package 202. In various embodiments, the actuator 204 may include an asymmetric magnet arrangement for actuation along an optical axis and/or along a plane that is orthogonal to the optical axis. The asymmetric magnet arrangement may include a lateral position control magnet 208 and a pair of transverse position control magnets 210 and 212. The lateral position control magnet 208 may be situated at a first side of the optical package 202. The pair of transverse position control magnets 210 and 212 may be situated on respective second and third sides of the optical package 202. The pair of transverse position control magnets 210 and 212 may be opposite one another with respect to an axis between the optical package 202 and the lateral position control magnet 208. The first side may be a side of the optical package 202 at which no transverse position control magnets are present. In some embodiments, the camera module 200 may include one or more magnetic field sensors (obscured by coils in FIG. 2 but visible, e.g., in FIG. 1) configured to measure one or more magnetic field components to enable determination of a position of the position sensor magnets 206.

A lens carrier 214 may allow mounting of autofocus coils 216 and other components of an autofocus system to the optical package 202. The actuator 204 may include optical image stabilization components such as, but not limited to, optical image stabilization coils 218, 220, and 222 mounted to an actuator base 224. In some embodiments, the transverse position control magnets 210 and 212 (e.g., dual-pole magnets) may include a pair of magnets with differing dominant magnetic field orientations (e.g., antiparallel), whereas the lateral position control magnet 208 (e.g., a single-pole magnet) may have only a single dominant magnetic field orientation.

In some embodiments, no actuator lateral magnet is situated on a remaining side of the optical package (occupied in FIG. 2 by dummy mass 226) at which neither the lateral position control magnet 208 nor the transverse position control magnets 210 and 212 are situated.

In some embodiments, a non-magnetic dummy mass 226 is situated on a remaining side of the optical package at which neither the lateral position control magnet 208 nor the transverse position control magnets 210 and 212 are situated.

Figure 3:
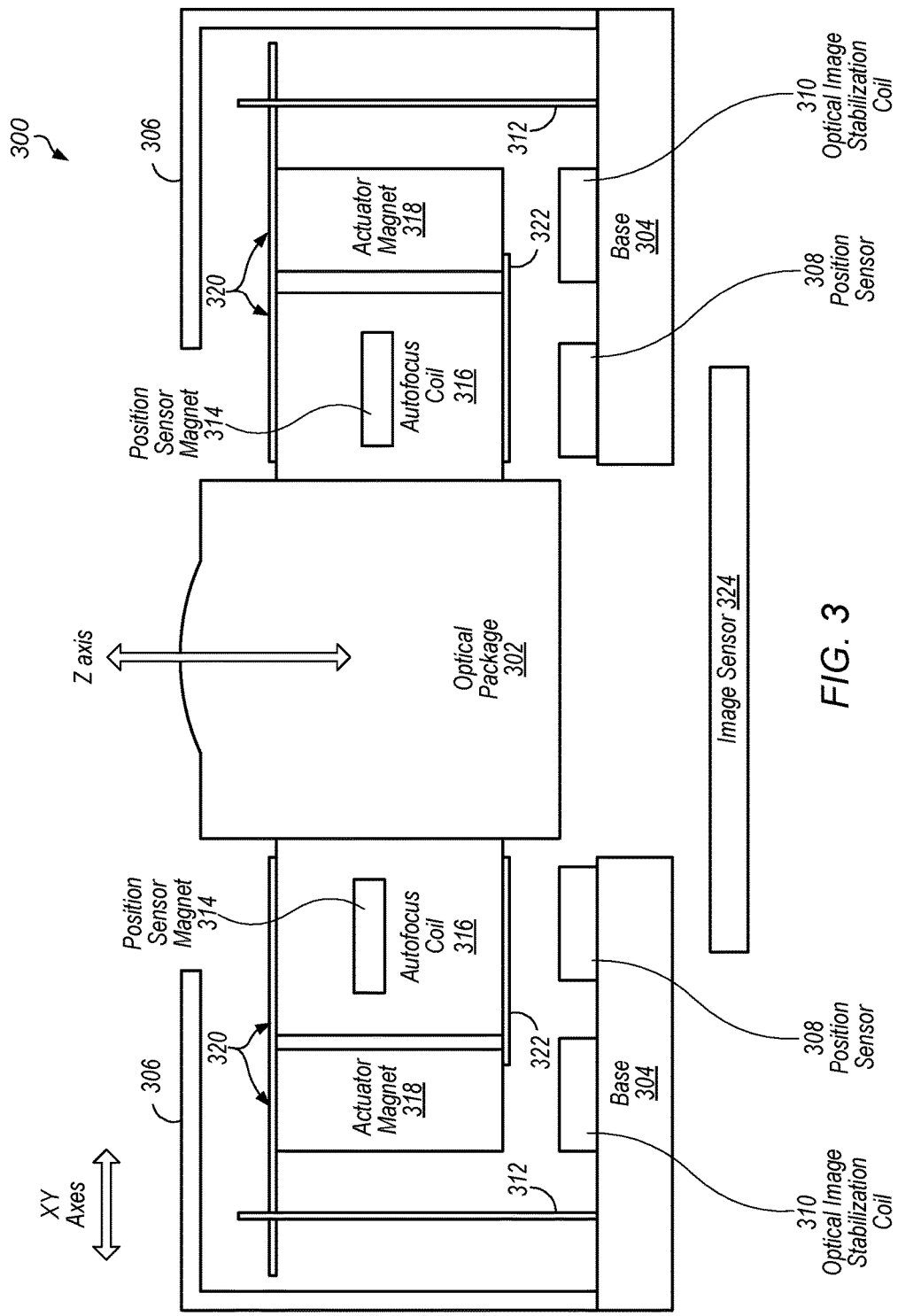
FIG. 3 illustrates a schematic side view of an example camera module having an example actuator for moving an optical package, in accordance with some embodiments. The example camera module of FIG. 3 may include a position sensor configuration that compensates for a bias field offset, in accordance with some embodiments.

FIG. 3 illustrates a schematic side view of an example camera module having an example actuator 300 for moving an optical package 302, in accordance with some embodiments. As shown in FIG. 3, the actuator 300 may include a base or substrate 304 and a cover 306. The base 304 may include and/or support one or more position sensors (e.g., Hall sensors, TMR sensors, GMR sensors, etc.) 308, one or more optical image stabilization coils 310, and one or more suspension wires 312, which may at least partly enable magnetic sensing for autofocus and/or optical image stabilization position detection, e.g., by detecting movements of position sensor magnets 314.

In some embodiments, the actuator 300 may include one or more autofocus coils 316 and one or more actuator magnets 318, which may at least partly enable autofocus functionality such as moving the optical package 302 along the z axis and/or along an optical axis defined by one or more lenses of the optical package 302. In some examples, at least one position sensor magnet 314 may be disposed proximate to at least one autofocus coil 316. In some embodiments, at least one position sensor magnet 314 may be coupled to at least one autofocus coil 316. For instance, the autofocus coils 316 may each define a central space that is encircled by the respective autofocus coil 316. The position sensor magnets 314 may be disposed within the central spaces encircled by the autofocus coils 316. Additionally or alternatively, the position sensor magnets 314 may be attached to support structures (not shown) that are fixed to the autofocus coils 316. For example, a support structure, to which a position sensor magnet 314 is attached, may be disposed within a central space encircled by an autofocus coil 316 and the support structure may be fixed to the autofocus coil 316.

In some embodiments, the actuator 300 may include four suspension wires 312. The optical package 302 may be suspended with respect to the base 304 by suspending one or more upper springs 320 on the suspension wires 312. In some embodiments, the actuator may include one or more lower springs 322. In the optical package 302, an optics component (e.g., one or more lens elements, a lens assembly, etc.) may be screwed, mounted or otherwise held in or by an optics holder. Note that upper spring(s) 320 and lower spring(s) 322 may be flexible to allow the optical package 302 a range of motion along the Z (optical) axis for optical focusing, and suspension wires 312 may be flexible to allow a range of motion on the x-y plane orthogonal to the optical axis for optical image stabilization. Also note that, while embodiments show the optical package 302 suspended on wires 312, other mechanisms may be used to suspend the optical package 302 in other embodiments.

In various embodiments, the camera module may include an image sensor 324. The image sensor 324 may be disposed below the optical package 302 such that light rays may pass through one or more lens elements of the optical package 302 (e.g., via an aperture at the top of the optical package 302) and to the image sensor 324.

Figure 4:
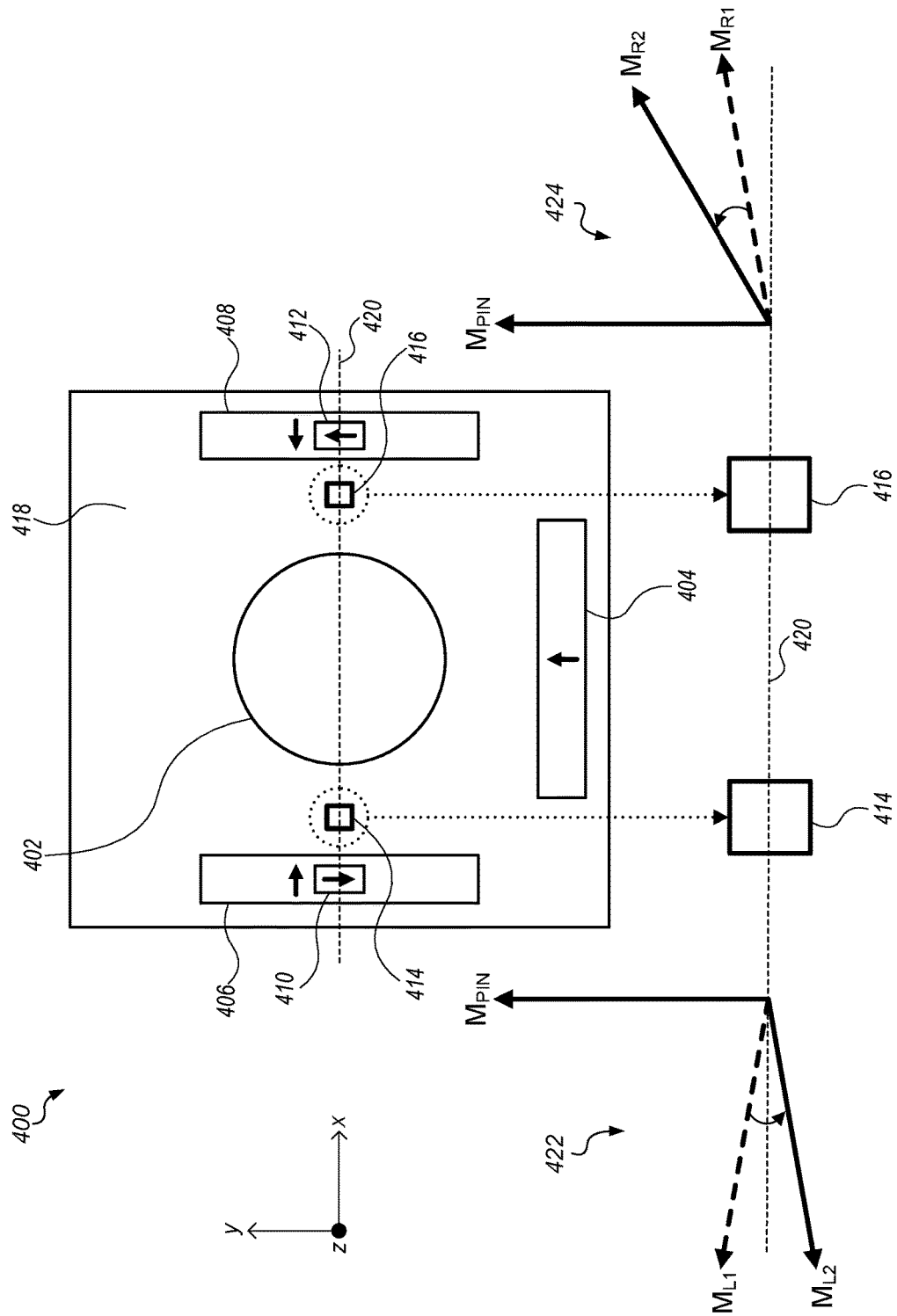
FIG. 4 illustrates a schematic top view of an example camera unit that includes an example position sensor configuration that does not compensate for a bias field offset. The example camera unit of FIG. 4 includes an example VCM actuator that has an asymmetric magnet arrangement that contributes to the bias field offset, in accordance with some embodiments.

FIG. 4 illustrates a schematic top view of an example camera unit 400 that includes an example position sensor configuration that does not compensate for a bias field offset. The camera unit 400 includes an example voice coil motor (VCM) actuator that has an asymmetric magnet arrangement that contributes to the bias field offset, in accordance with some embodiments. Although not shown in FIG. 4, the VCM actuator may include one or more coils (e.g., one or more optical image stabilization coils and/or one or more autofocus coils) configured to magnetically interact with magnets of the asymmetric magnet arrangement to provide optical image stabilization and/or focusing. The coils, and some other components of the camera unit 400 and/or the VCM actuator that are not shown in FIG. 4, are discussed above with reference to FIGS. 2 and 3.

The camera unit 400 may include an optical package 402 and an asymmetric magnet arrangement. The optical package 402 may include one or more lenses (not shown) that define an optical axis. In some examples, the optical axis may be substantially parallel to the z axis. The asymmetric magnet arrangement may be configured to provide (VCM) actuation along the optical axis and/or along a plane that is orthogonal to the optical axis. In some examples, the plane that is orthogonal to the optical axis may be parallel to the x-y plane.

In various embodiments, the asymmetric magnet arrangement may include one or multiple magnets. For instance, the asymmetric magnet arrangement may include a first magnet 404, a second magnet 406, and a third magnet 408. In some examples, the asymmetric magnet arrangement may produce an asymmetric magnetic field. For example, the arrows depicted in the magnets 404, 406, and 408 indicate predominant field directions of the magnetic fields produced by the magnets 404, 406, and 408. As in the illustrated example, the first magnet 404 may produce one or more magnetic fields that predominantly point in the positive y direction. The second magnet 406 may produce one or more magnetic fields that predominantly point in the positive x direction. The third magnet 408 may include one or more magnetic fields that predominantly point in the negative x direction. That is, the second magnet 406 and the third magnet 408 may produce magnetic fields that counteract one another, whereas the first magnet 402 may produce one or more magnetic fields that are not counteracted by magnets of the asymmetric magnet arrangement. Accordingly, the asymmetric magnet arrangement may produce an asymmetric magnetic field that is biased in the positive y direction. In other words, in some cases, the asymmetric magnetic field may include a bias field that is offset relative to the x axis.

In some embodiments, the camera unit 400 may include one or more position sensor magnets. The position sensor magnets may include a first position sensor magnet 410 and a second position sensor magnet 412. In some embodiments, the first position sensor magnet 410 and the second position sensor magnet 412 may be coupled to the optical package 402. As such, the first position sensor magnet 410 and the second position sensor magnet 412 may be configured to move along with the optical package 402.

Furthermore, the camera unit 400 may include a position sensor configuration that does not compensate for the bias field offset. For example, the position sensor configuration may include a first magnetic field sensor 414 and a second magnetic field sensor 416. The first magnetic field sensor 414 and the second magnetic field sensor 416 may be attached to a base structure 418 of the camera unit 400. The optical package 402 and the position sensor magnets 410 and 412 may be configured to move relative to the base structure 418, e.g., via VCM actuation.

In some embodiments, the first position sensor magnet 410 may contribute to one or more magnetic field components that have a predominant field direction pointing in a first direction, e.g., in the negative y direction as indicated by the arrow depicted in the first position sensor magnet 410. Furthermore, the second position sensor magnet 412 may contribute to one or more magnetic field components that have a predominant field direction pointing in a second direction that is opposite the first direction, e.g., in the positive y direction as indicated by the arrow depicted in the second position sensor magnet 412. In various embodiments, the magnetic field sensors 414, 416 may be configured such that movement of the optical package 402 affects the signals produced by the magnetic field sensors differently. For example, due to the opposing predominant field directions of the position sensor magnets 410, 412, the first magnetic field sensor 414 may detect a first autofocus-related magnetic field component (e.g., from the first position sensor magnet 410) and the second magnetic field sensor 416 may detect a second autofocus-related magnetic field component (e.g., from the second position sensor magnet 412), as the optical package 402 moves along the optical axis. The second autofocus-related magnetic field component may be opposite the first autofocus-related magnetic field component.

In some examples, the first magnetic field sensor 414 and/or the second magnetic field sensor 416 may be aligned along an axis 420 that is parallel to the x axis, and orthogonal to the optical axis 402 and/or the z axis. The first magnetic field sensor 414 may be configured to detect one or more magnetic field components to enable determination of a position, along the optical axis, of the first position sensor magnet 410 and/or the optical package 402. The magnetic field components may include a bias field component that is offset relative to the axis 420. For instance, the bias field component may be offset relative to the axis 420 based at least in part on the asymmetric magnetic field of the asymmetric magnet arrangement. In the illustrated example, neither the first magnetic field sensor 414 nor the second magnetic field sensor 416 include compensation magnets that compensate for the bias field offset.

FIG. 4 includes example vector graphs that indicate magnetic field components that may be detected at the respective magnetic field sensors 414 and 416. The first vector graph 422 corresponds to the first magnetic field sensor 414, and the second vector graph 424 corresponds to the second magnetic field sensor 416.

As indicated by the first vector graph 422, which corresponds to the first magnetic field sensor 414, the $M_{PIN}$ vector may represent one or more magnetic field components that point in the positive y direction. The $M_{PIN}$ vector may be fixed based on the internal structure of the first magnetic field sensor 414. The $M_{L1}$ vector may represent one or more magnetic field components produced by the asymmetric magnet arrangement. The one or more magnetic field components produced by the asymmetric magnet arrangement may include the bias field that is offset relative to the axis 420 and/or the x axis. Furthermore, the $M_{L2}$ vector may represent a resultant vector based on the $M_{L1}$ vector and one or more magnetic field components produced by the first position sensor magnet 410. The $M_{L2}$ vector may change as the first position sensor magnet 410 and the optical package 402 move along the optical axis (e.g., for autofocus purposes). In some examples, the angle between the $M_{L1}$ vector and the $M_{L2}$ vector may increase as the first position sensor magnet 410 moves in the positive z direction, and decrease as the first position sensor magnet 410 moves in the negative z direction. In other examples, the angle between the $M_{L1}$ vector and the $M_{L2}$ vector may decrease as the first position sensor magnet 410 moves in the positive z direction, and increase as the first position sensor magnet 410 moves in the negative z direction.

As indicated by the second vector graph 424, which corresponds to the second magnetic field sensor 416, the $M_{PIN}$ vector may represent one or more magnetic field components that point in the positive y direction. The $M_{PIN}$ vector may be fixed based on the internal structure of the second magnetic field sensor 416. The $M_{R1}$ vector may represent one or more magnetic field components produced by the asymmetric magnet arrangement. The one or more magnetic field components produced by the asymmetric magnet arrangement may include the bias field that is offset relative to the axis 420 and/or the x axis. Furthermore, the $M_{R2}$ vector may represent a resultant vector based on the $M_{R1}$ vector and one or more magnetic field components produced by the second position sensor magnet 412. The $M_{R2}$ vector may change as the second position sensor magnet 410 and the optical package 402 move along the optical axis (e.g., for autofocus purposes). In some examples, the angle between the $M_{R1}$ vector and the $M_{R2}$ vector may increase as the second position sensor magnet 412 moves in the positive z direction, and decrease as the second position sensor magnet 412 moves in the negative z direction. In other examples, the angle between the $M_{R1}$ vector and the $M_{R2}$ vector may decrease as the second position sensor magnet 412 moves in the positive z direction, and increase as the second position sensor magnet 412 moves in the negative z direction.

The resultant $M_{L2}$ vector and the resultant $M_{R2}$ vector may be offset relative to one another. For instance, as indicated in the vector graphs 422 and 424, the $M_{L2}$ vector is at a first angle relative to the axis 420 and/or the x axis, and the $M_{R2}$ vector is at a second angle relative to the axis 420 and/or the x axis, and the second angle is greater than the first angle. Note also that the $M_{L2}$ vector is not at 180 degrees relative to the $M_{R2}$ vector. Due to the relative offset between the $M_{L2}$ vector and the $M_{R2}$ vector, caused by the bias field offset, position sensing based on signals from the first magnetic field sensor 414 and the second magnetic field sensor 416, which do not compensate for the bias field offset, may lead to incomplete external field rejection.

Figure 5:
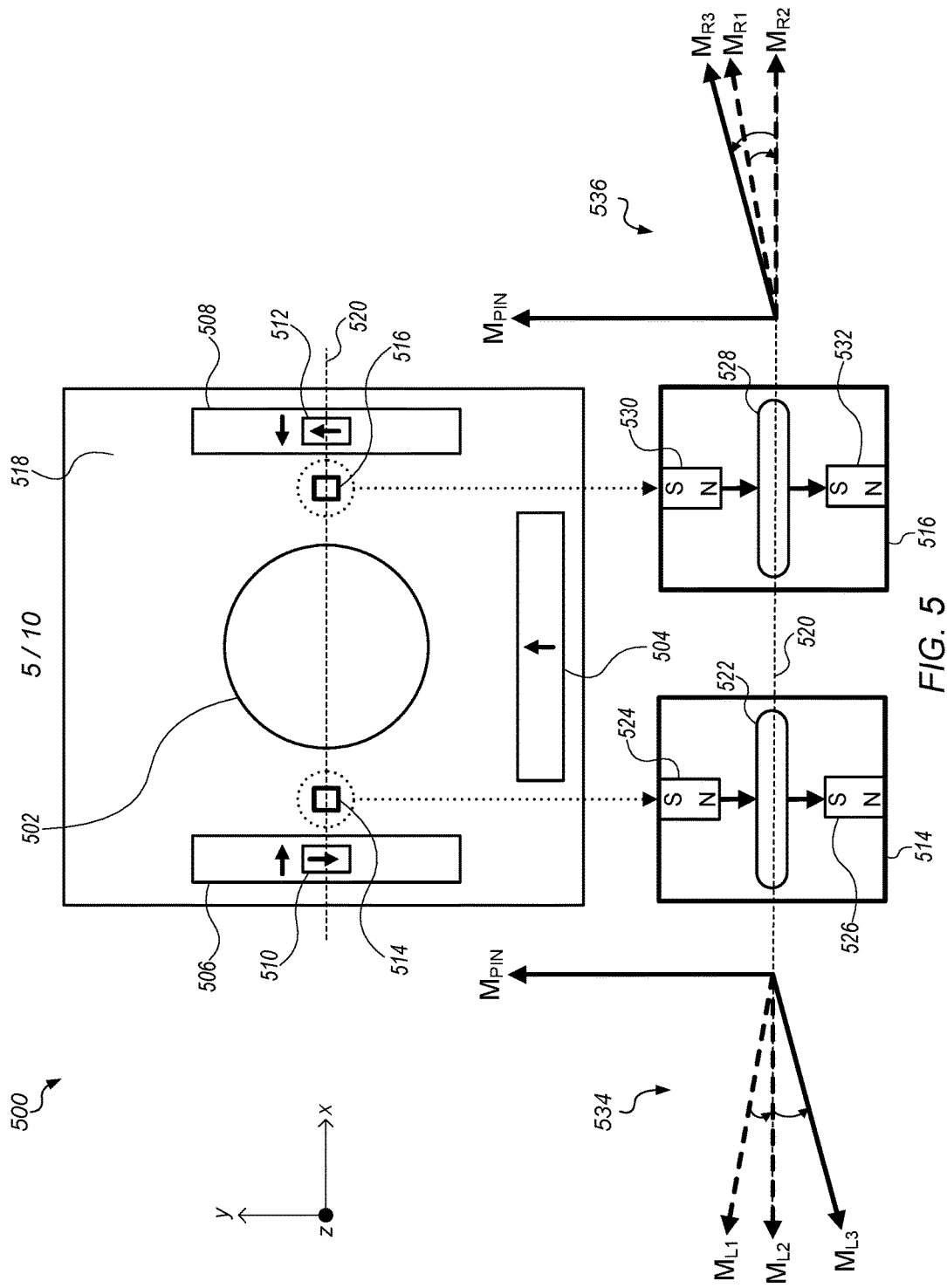
FIG. 5 illustrates a schematic top view of an example camera unit that includes an example position sensor configuration that compensates for a bias field offset, in accordance with some embodiments. The example camera unit of FIG. 5 includes an example VCM actuator that has an asymmetric magnet arrangement that contributes to the bias field offset, in accordance with some embodiments.

FIG. 5 illustrates a schematic top view of an example camera unit 500 that includes an example position sensor configuration that compensates for a bias field offset, in accordance with some embodiments. The camera unit 500 includes an example voice coil motor (VCM) actuator that has an asymmetric magnet arrangement that contributes to the bias field offset, in accordance with some embodiments. Although not shown in FIG. 5, the VCM actuator may include one or more coils (e.g., one or more optical image stabilization coils and/or one or more autofocus coils) configured to magnetically interact with magnets of the asymmetric magnet arrangement to provide optical image stabilization and/or focusing. The coils, and some other components of the camera unit 500 and/or the VCM actuator that are not shown in FIG. 5, are discussed above with reference to FIGS. 2 and 3.

The camera unit 500 may include an optical package 502 and an asymmetric magnet arrangement. The optical package 502 may include one or more lenses (not shown) that define an optical axis. In some examples, the optical axis may be substantially parallel to the z axis. The asymmetric magnet arrangement may be configured to provide VCM actuation along the optical axis and/or along a plane that is orthogonal to the optical axis. In some examples, the plane that is orthogonal to the optical axis may be parallel to the x-y plane.

In various embodiments, the asymmetric magnet arrangement may include one or multiple magnets. For instance, the asymmetric magnet arrangement may include a first magnet 504, a second magnet 506, and a third magnet 508. In some examples, the asymmetric magnet arrangement may produce an asymmetric magnetic field. For example, the arrows depicted in the magnets 504, 506, and 508 indicate predominant field directions of the magnetic fields produced by the magnets 504, 506, and 508. As in the illustrated example, the first magnet 504 may produce one or more magnetic fields that predominantly point in the positive y direction. The second magnet 506 may produce one or more magnetic fields that predominantly point in the positive x direction. The third magnet 508 may include one or more magnetic fields that predominantly point in the negative x direction. That is, the second magnet 506 and the third magnet 508 may produce magnetic fields that counteract one another, whereas the first magnet 502 may produce one or more magnetic fields that are not counteracted by magnets of the asymmetric magnet arrangement. Accordingly, the asymmetric magnet arrangement may produce an asymmetric magnetic field that is biased in the positive y direction. In other words, in some cases, the asymmetric magnetic field may include a bias field that is offset relative to the x axis.

In some embodiments, the camera unit 500 may include one or more position sensor magnets. The position sensor magnets may include a first position sensor magnet 510 and a second position sensor magnet 512. In some examples, the first position sensor magnet 510 and the second position sensor magnet 512 may be coupled to the optical package 502. As such, the first position sensor magnet 510 and the second position sensor magnet 512 may be configured to move along with the optical package 502.

Furthermore, the camera unit 500 may include a position sensor configuration that includes one or more magnetic field sensor packages. In some examples, the magnetic field sensor packages may include a first magnetic field sensor package 514 and a second magnetic field sensor package 516. The first magnetic field sensor package 514 and the second magnetic field sensor package 516 may be attached to a base structure 518 of the camera unit 500. The optical package 502 and the position sensor magnets 510 and 512 may be configured to move relative to the base structure 518, e.g., via VCM actuation.

In some embodiments, the first magnetic field sensor package 514 may be disposed proximate the first position sensor magnet 510 such that a magnetic field sensor of the first magnetic field sensor package 514 is capable of detecting one or more magnetic field components produced by the first position sensor magnet 510. For instance, the first magnetic field sensor package 514 and the first position sensor magnet 510 may be situated at, or proximate to, a first side and/or portion of the optical package 502. The second magnetic field sensor package 516 may be disposed proximate the second position sensor magnet 512 such that a magnetic field sensor of the second magnetic field package 516 is capable of detecting one or more magnetic field components produced by the second position sensor magnet 512. For instance, the second magnetic field sensor package 516 and the second position sensor magnet 512 may be situated at, or proximate to, a second side and/or portion of the optical package 502. The second side of the optical package 502 may be opposite the first side of the optical package 502.

In some embodiments, the first position sensor magnet 510 may contribute to one or more magnetic field components that have a predominant field direction pointing in a first direction, e.g., in the negative y direction as indicated by the arrow depicted in the first position sensor magnet 510. Furthermore, the second position sensor magnet 512 may contribute to one or more magnetic field components that have a predominant field direction pointing in a second direction that is opposite the first direction, e.g., in the positive y direction as indicated by the arrow depicted in the second position sensor magnet 512. In various embodiments, the magnetic field sensors of the magnetic field sensor packages 514, 516 and the position sensor magnets 510, 512 may be configured such that movement of the optical package 502 affects the signals produced by the magnetic field sensors differently. For example, due to the opposing predominant field directions of the position sensor magnets 510, 512, a magnetic field sensor of the first magnetic field sensor package 514 may detect a first autofocus-related magnetic field component (e.g., from the first position sensor magnet 510) and a magnetic field sensor of the second magnetic field sensor package 516 may detect a second autofocus-related magnetic field component (e.g., from the second position sensor magnet 512), as the optical package 502 moves along the optical axis. The second autofocus-related magnetic field component may be opposite the first autofocus-related magnetic field component.

In some examples, the first magnetic field sensor package 514 and/or the second magnetic field sensor package 516 may be aligned along an axis 520 that is parallel to the x axis, and orthogonal to the optical axis 502 and/or the z axis. The first magnetic field sensor package 514 may include a first magnetic field sensor 522 (e.g., a Hall sensor, a tunneling magnetoresistance (TMR) sensor, and/or a giant magnetoresistance (GMR) sensor) and a first set of compensation magnets (e.g., one or more hard magnets). In some examples, the first set of compensation magnets may be coupled to the first magnetic field sensor 522. For instance, the first set of compensation magnets may include a first compensation magnet 524 and a second compensation magnet 526. The first compensation magnet 524 may be coupled to a first side of the first magnetic field sensor 522. The second compensation magnet 526 may be coupled to a second side of the second magnetic field sensor 528. The second side may be opposite the first side. In some embodiments, one or more of the first set of compensation magnets may be disposed at least partially within the first magnetic field sensor 522.

The first magnetic field sensor 522 may define a first longitudinal axis (e.g., first longitudinal axis 134 illustrated in FIG. 1). In some examples, the first longitudinal axis may be parallel to and/or coincident with the axis 520. Furthermore, the first magnetic field sensor 522 may be configured to detect one or more magnetic field components to enable determination of a position, along the optical axis, of the first position sensor magnet 510 and/or the optical package 502. The magnetic field components may include at least one magnetic field component produced by the first position sensor magnet 510. The first set of compensation magnets may be configured to contribute to one or more compensation magnetic fields. In various embodiments, the compensation magnetic fields counteract a first bias field component that is offset relative to the first longitudinal axis and/or the axis 520. In some cases, the first bias field component may be offset relative to the first longitudinal axis and/or the axis 520 based on the asymmetric magnetic field. For example, as indicated by the arrows depicted in the first magnetic field sensor package 514, the first set of compensation magnets may contribute to one or more compensation magnetic field components that have predominant field directions pointing in the negative y direction. As such, the first set of compensation magnets may counteract a first bias field component that points in the positive y direction at the first magnetic field sensor 522 based on the asymmetric magnetic field.

The second magnetic field sensor package 516 may include a second magnetic field sensor 528 (e.g., a Hall sensor, a TMR sensor, and/or a GMR sensor) and a second set of compensation magnets (e.g., one or more hard magnets). In some examples, the second set of compensation magnets may be coupled to the second magnetic field sensor 528. For instance, the second set of compensation magnets may include a first compensation magnet 530 and a second compensation magnet 532. The first compensation magnet 530 may be coupled to a first side of the second magnetic field sensor 528. The second compensation magnet 532 may be coupled to a second side of the second magnetic field sensor 528. The second side may be opposite the first side. In some embodiments, one or more of the second set of compensation magnets may be disposed at least partially within the second magnetic field sensor 528.

The second magnetic field sensor 528 may define a second longitudinal axis (e.g., second longitudinal axis 130 illustrated in FIG. 1). In some examples, the second longitudinal axis may be parallel to and/or coincident with the axis 520, the first longitudinal axis of the first magnetic field sensor 522, or both. Furthermore, the second magnetic field sensor 528 may be configured to detect one or more magnetic field components to enable determination of a position, along the optical axis, of the second position sensor magnet 512 and/or the optical package 502. The magnetic field components may include at least one magnetic field component produced by the second position sensor magnet 512. The second set of compensation magnets may be configured to contribute to one or more compensation magnetic fields. In various embodiments, the compensation magnetic fields counteract a second bias field component that is offset relative to the second longitudinal axis and/or the axis 520. In some cases, the second bias field component may be offset relative to the second longitudinal axis and/or the axis 520 based on the asymmetric magnetic field. For example, as indicated by the arrows depicted in the second magnetic field sensor package 516, the second set of compensation magnets may contribute to one or more compensation magnetic field components that have predominant field directions pointing in the negative y direction. As such, the second set of compensation magnets may counteract a second bias field component that points in the positive y direction at the second magnetic field sensor 528 based on the asymmetric magnetic field.

In various embodiments, the first magnetic field sensor 522 and/or the second magnetic field sensor 528 may have an elongated shape. For instance, the first magnetic field sensor 522 may have an elongated shape with a first long dimension that is longer than other dimensions of the first magnetic field sensor 522. Likewise, the second magnetic field sensor 528 may have an elongated shape with a second long dimension that is longer than other dimensions of the second magnetic field sensor 528.

The first long dimension of the first magnetic field sensor 522 may define the first longitudinal axis of the first magnetic field sensor 522. Furthermore, the first bias field component may include a first magnetic flux vector that points in a first direction. The first magnetic field sensor 522 may be oriented such that the first long dimension extends along a second direction that is orthogonal to the first direction of the first bias field component. That is, the first longitudinal axis of the first magnetic field sensor 522 may extend along the second direction that is orthogonal to the first direction of the first bias field component.

The second long dimension of the second magnetic field sensor 528 may define the second longitudinal axis of the second magnetic field sensor 528. Furthermore, the second bias field component may include a second magnetic flux vector that points in a first direction. The second magnetic field sensor 528 may be oriented such that the second long dimension extends along a second direction that is orthogonal to the first direction of the second bias field component. That is, the second longitudinal axis of the second magnetic field sensor 528 may extend along the second direction that is orthogonal to the first direction of the second bias field component.

In some embodiments, the first compensation magnet 524 of the first magnetic field sensor 522 may be coupled to a first side of the first magnetic field sensor 522. The second compensation magnet 526 of the first magnetic field sensor 522 may be coupled to a second side of the first magnetic field sensor 522. The second side may be opposite the first side. In some examples, the first compensation magnet 524 and the second compensation magnet 526 may be coupled to opposing elongate sides of the first magnetic field sensor 522. For instance, when the first magnetic field sensor 522 is formed to an elongated shape, the first magnetic field sensor 522 may include a first elongate side that extends along the first long dimension, and a second elongate side that extends along the first long dimension and that is opposite the first elongate side. The first compensation magnet 524 may be coupled to the first magnetic field sensor 522 at, or proximate to, the first elongate side. The second compensation magnet 526 may be coupled to the first magnetic field sensor 522 at, or proximate to, the second elongate side.

In some embodiments, the first compensation magnet 530 of the second magnetic field sensor 528 may be coupled to a first side of the second magnetic field sensor 528. The second compensation magnet 532 of the second magnetic field sensor 528 may be coupled to a second side of the second magnetic field sensor 528. The second side may be opposite the first side. In some examples, the first compensation magnet 530 and the second compensation magnet 532 may be coupled to opposing elongate sides of the second magnetic field sensor 528. For instance, when the second magnetic field sensor 528 is formed to an elongated shape, the second magnetic field sensor 528 may include a first elongate side and a second elongate side that extend along the second long dimension. The first compensation magnet 530 may be coupled to the second magnetic field sensor 528 at, or proximate to, the first elongate side. The second compensation magnet 532 may be coupled to the second magnetic field sensor 528 at, or proximate to, the second elongate side.

FIG. 5 includes example vector graphs that indicate magnetic field components that may be detected at the respective magnetic field sensors 522 and 528. The first vector graph 534 corresponds to the first magnetic field sensor 522, and the second vector graph 536 corresponds to the second magnetic field sensor 528.

As indicated by the first vector graph 534, which corresponds to the first magnetic field sensor 522, the $M_{PIN}$ vector may represent one or more magnetic field components that point in the positive y direction. The $M_{PIN}$ vector may be fixed based on the internal structure of the first magnetic field sensor 522. The $M_{L1}$ vector may represent one or more magnetic field components produced by the asymmetric magnet arrangement. The one or more magnetic field components produced by the asymmetric magnet arrangement may include the first bias field component that is offset relative to the axis 520, the first longitudinal axis, and/or the x axis. Furthermore, the $M_{L2}$ vector may represent a vector based on the $M_{L1}$ vector and one or more magnetic field components produced by the first set of compensation magnets (e.g., the compensation magnetic field components produced by the first compensation magnet 524 and the second compensation magnet 526). That is, the $M_{L2}$ vector indicates a cancellation of the bias field offset relative to the axis 520, the first longitudinal axis, and/or the x axis. Furthermore, the $M_{L3}$ vector may represent a resultant vector based on the $M_{L1}$ vector, the $M_{L2}$ vector, and one or more magnetic field components produced by the first position sensor magnet 510. The $M_{L2}$ vector may change as the first position sensor magnet 510 and the optical package 502 are moved along the optical axis (e.g., for autofocus purposes). In some examples, the angle between the $M_{L2}$ vector and the $M_{L3}$ vector may increase as the first position sensor magnet 510 moves in the positive z direction, and decrease as the first position sensor magnet 510 moves in the negative z direction. In other examples, the angle between the $M_{L2}$ vector and the $M_{L3}$ vector may decrease as the first position sensor magnet 510 moves in the positive z direction, and increase as the first position sensor magnet 510 moves in the negative z direction.

As indicated by the second vector graph 536, which corresponds to the second magnetic field sensor 528, the $M_{PIN}$ vector may represent one or more magnetic field components that point in the positive y direction. The $M_{PIN}$ vector may be fixed based on the internal structure of the second magnetic field sensor 528. The $M_{R1}$ vector may represent one or more magnetic field components produced by the asymmetric magnet arrangement. The one or more magnetic field components produced by the asymmetric magnet arrangement may include the second bias field component that is offset relative to the axis 520, the second longitudinal axis, and/or the x axis. Furthermore, the $M_{R2}$ vector may represent a vector based on the $M_{R1}$ vector and one or more magnetic field components produced by the second set of compensation magnets (e.g., the compensation magnetic field components produced by the first compensation magnet 530 and the second compensation magnet 532). That is, the $M_{R2}$ vector indicates a cancellation of the bias field offset relative to the axis 520, the second longitudinal axis, and/or the x axis. Furthermore, the $M_{R3}$ vector may represent a resultant vector based on the $M_{R1}$ vector, the $M_{R2}$ vector, and one or more magnetic field components produced by the second position sensor magnet 512. The $M_{R3}$ vector may change as the second position sensor magnet 512 and the optical package 502 move along the optical axis (e.g., for autofocus purposes). In some examples, the angle between the $M_{R2}$ vector and the $M_{R3}$ vector may increase as the second position sensor magnet 512 moves in the positive z direction, and decrease as the second position sensor magnet 512 moves in the negative z direction. In other examples, the angle between the $M_{R2}$ vector and the $M_{R3}$ vector may decrease as the second position sensor magnet 512 moves in the positive z direction, and increase as the second position sensor magnet 512 moves in the negative z direction.

Due to the compensation magnets of the first magnetic field sensor package 514 and the second magnetic field sensor package 516, the resultant $M_{L3}$ vector and the resultant $M_{R3}$ vector may not be offset relative to one another. For instance, as indicated in the vector graphs 534 and 536, the $M_{L3}$ vector is at a first angle relative to the axis 520 and/or the x axis, the $M_{R3}$ vector is at a second angle relative to the axis 520 and/or the x axis, and the second angle may be substantially the same as the first angle. Note also that the $M_{L3}$ vector is at or about 180 degrees relative to the $M_{R3}$ vector. Absent a relative offset between the $M_{L3}$ vector and the $M_{R3}$ vector, position sensing based on signals from the first elongate magnetic field sensor 522 and the second elongate magnetic field sensor 528, which compensate for the bias field offset, may result in complete, or substantially complete, external field rejection.

Figure 6:
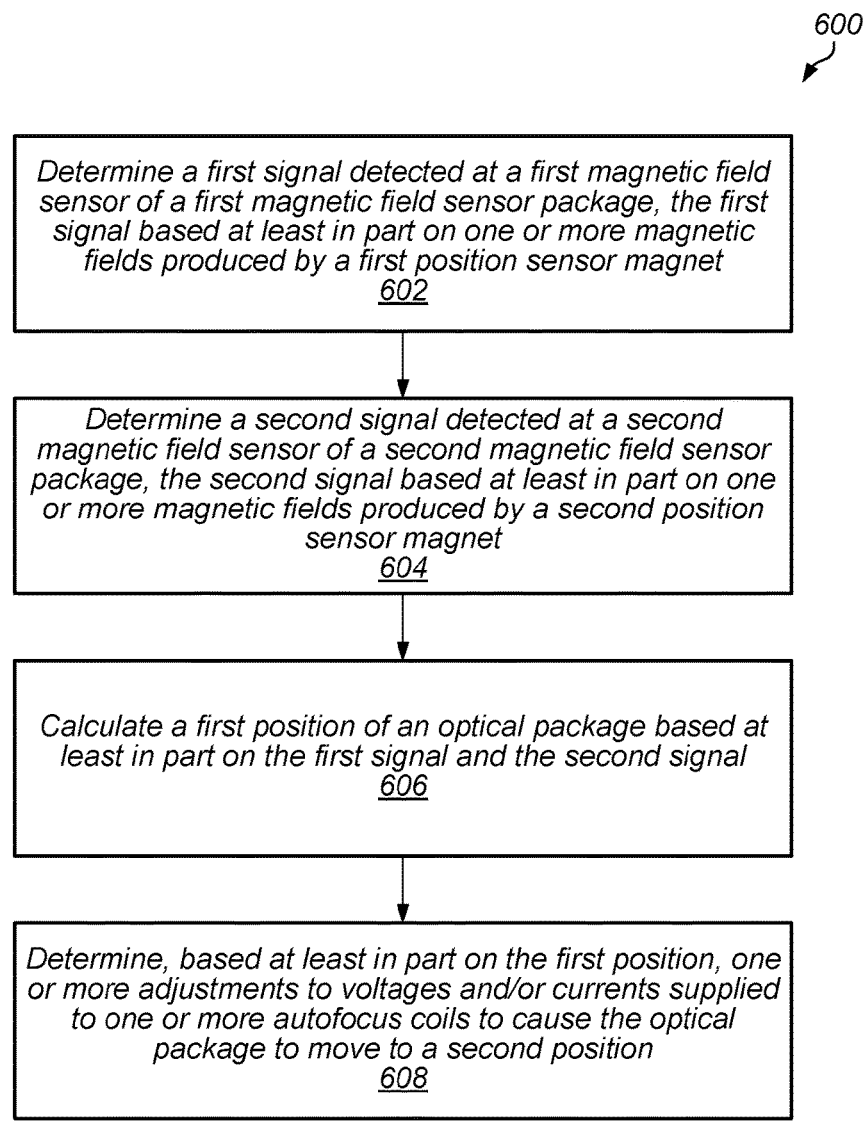
FIG. 6 is a flowchart of an example method of position sensing using a position sensor configuration that compensates for a bias field offset, in accordance with some embodiments.

FIG. 6 is a flowchart of an example method 600 of position sensing using a position sensor configuration that compensates for a bias field offset, in accordance with some embodiments. At 602, the method 600 may include determining a first signal detected at a first magnetic field sensor of a first magnetic field sensor package. For instance, the first signal may be based at least in part on one or more magnetic fields produced by a first position sensor magnet. The first magnetic field package may be configured to compensate for a bias field offset, e.g., as discussed above with reference to FIGS. 1 and 5. At 604, the method 600 may include determining a second signal detected at a second magnetic field sensor of a second magnetic field sensor package. For instance, the second signal may be based at least in part on one or more magnetic fields produced by a second position sensor magnet. The second magnetic field package may be configured to compensate for a bias field offset, e.g., as discussed above with reference to FIGS. 1 and 5. At 606, the method 600 may include calculating a first position of an optical package based at least in part on the first signal and the second signal. For instance, the first position of the optical package may be calculated based on a difference between the first signal and the second signal. At 608, the method 600 may include determining one or more adjustments to voltages and/or currents supplied to one or more autofocus coils to cause the optical package to move to a second position that is different than the first position.

Figure 7:
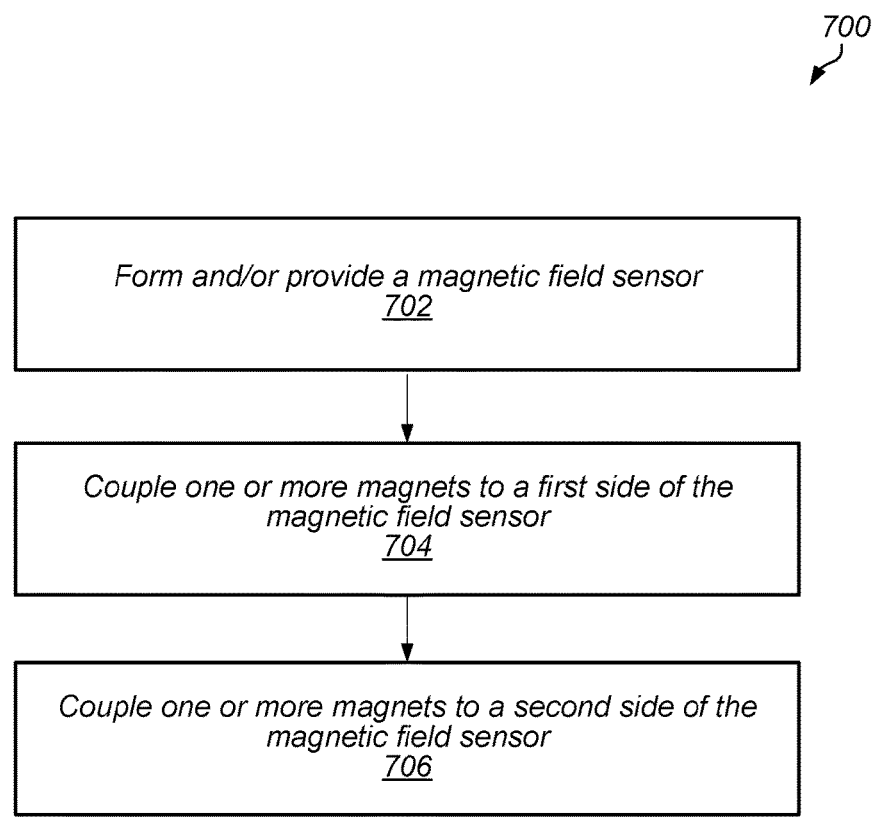
FIG. 7 is a flowchart of an example method of manufacturing a magnetic field sensor package that compensates for a bias field offset, in accordance with some embodiments.

FIG. 7 is a flowchart of an example method 700 of manufacturing a magnetic field sensor package that compensates for a bias field offset, in accordance with some embodiments. At 702, the method 700 may include forming and/or manufacturing a magnetic field sensor. At 704, the method 700 may include coupling one or more magnets (e.g., one or more hard magnets) to a first side of the magnetic field sensor. Furthermore, at 706, the method 700 may include coupling one or more magnets (e.g., one or more hard magnets) to a second side of the magnetic field sensor. The second side may be opposite the first side. In some embodiments, the magnetic field sensor and/or the compensation magnets may be manufactured using photochemical etching processes. In some implementations, the compensation magnets may be at least partially embedded within the magnetic field sensor. For instance, the compensation magnets may be deposited within pockets formed along at least a portion of one or more sides of the magnetic field sensor. In some instances, the magnetic field sensor and/or the compensation magnets may be dimensioned and/or configured such that the magnetic field sensor is saturated with a saturation field. By saturating the magnetic field sensor, undesirable hysteresis effects may be mitigated. In some examples, the magnetic field sensor may be formed to an elongated shape with a long dimension that is longer than other dimensions of the magnetic field sensor. The elongated shape may reduce the saturation field required to saturate the magnetic field sensor along the long dimension as compared to some magnetic field sensors that do not have an elongated shape.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 8:
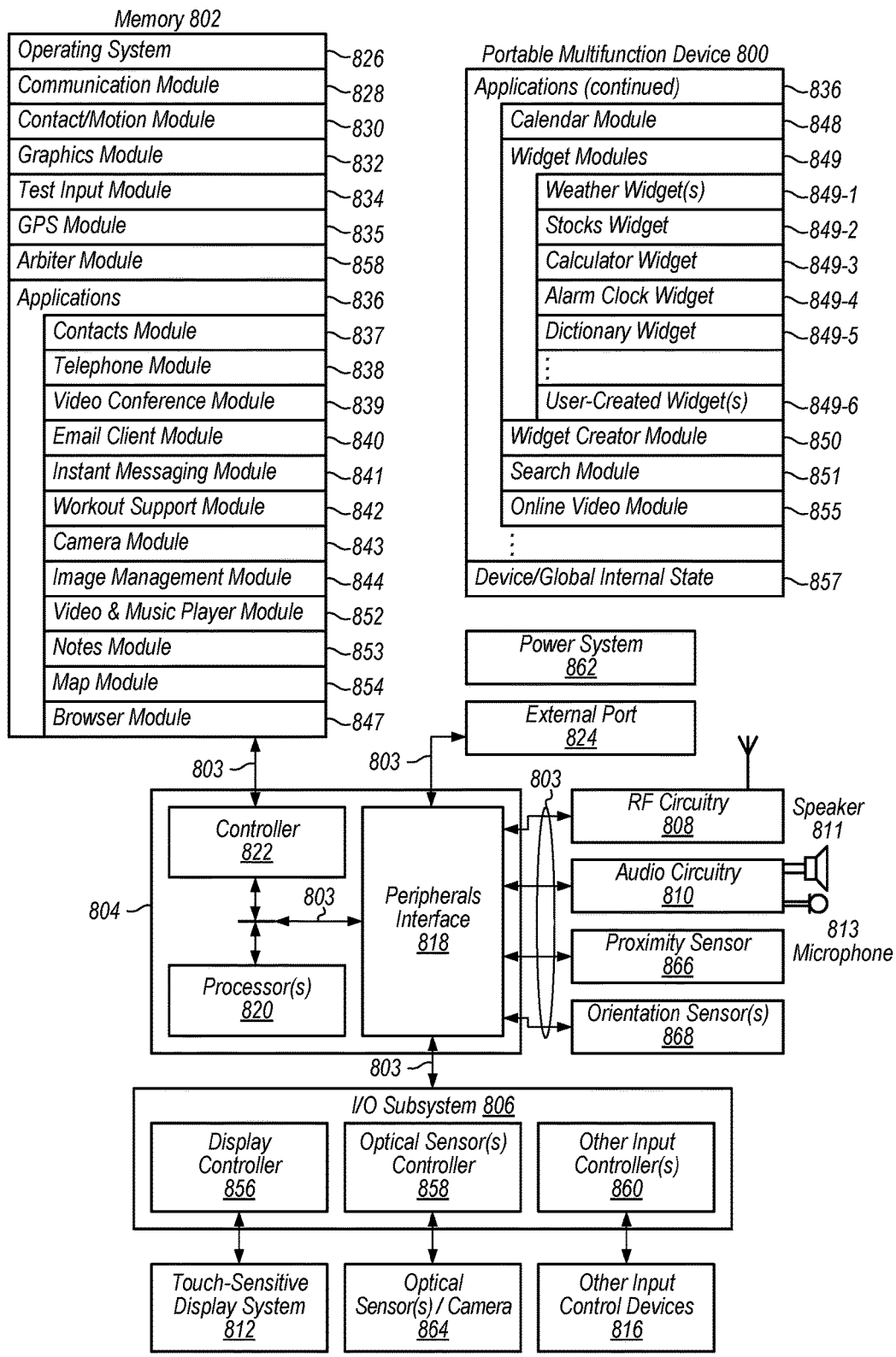
FIG. 8 illustrates a block diagram of an example portable multifunction device that may include a position sensor configuration that compensates for a bias field offset, in accordance with some embodiments.

Attention is now directed toward embodiments of portable devices with cameras. FIG. 8 is a block diagram illustrating portable multifunction device 800 with camera 864 in accordance with some embodiments. Camera 864 is sometimes called an "optical sensor" for convenience, and may also be known as or called an optical sensor system. Device 800 may include memory 802 (which may include one or more computer readable storage mediums), memory controller 822, one or more processing units (CPUs) 820, peripherals interface 818, RF circuitry 808, audio circuitry 810, speaker 811, touch-sensitive display system 812, microphone 813, input/output (I/O) subsystem 806, other input or control devices 816, and external port 824. Device 800 may include one or more optical sensors 864. These components may communicate over one or more communication buses or signal lines 803.

It should be appreciated that device 800 is only one example of a portable multifunction device, and that device 800 may have more or fewer components than shown, may combine two or more components, or may have a different configuration or arrangement of the components. The various components shown in FIG. 8 may be implemented in hardware, software, or a combination of hardware and software, including one or more signal processing and/or application specific integrated circuits.

Memory 802 may include high-speed random access memory and may also include non-volatile memory, such as one or more magnetic disk storage devices, flash memory devices, or other non-volatile solid-state memory devices. Access to memory 802 by other components of device 800, such as CPU 820 and the peripherals interface 818, may be controlled by memory controller 822.

Peripherals interface 818 can be used to couple input and output peripherals of the device to CPU 820 and memory 802. The one or more processors 820 run or execute various software programs and/or sets of instructions stored in memory 802 to perform various functions for device 800 and to process data.

In some embodiments, peripherals interface 818, CPU 820, and memory controller 822 may be implemented on a single chip, such as chip 804. In some other embodiments, they may be implemented on separate chips.

RF (radio frequency) circuitry 808 receives and sends RF signals, also called electromagnetic signals. RF circuitry 808 converts electrical signals to/from electromagnetic signals and communicates with communications networks and other communications devices via the electromagnetic signals. RF circuitry 808 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 810, speaker 811, and microphone 813 provide an audio interface between a user and device 800. Audio circuitry 810 receives audio data from peripherals interface 818, converts the audio data to an electrical signal, and transmits the electrical signal to speaker 811. Speaker 811 converts the electrical signal to human-audible sound waves. Audio circuitry 810 also receives electrical signals converted by microphone 813 from sound waves. Audio circuitry 810 converts the electrical signal to audio data and transmits the audio data to peripherals interface 818 for processing. Audio data may be retrieved from and/or transmitted to memory 802 and/or RF circuitry 808 by peripherals interface 818. In some embodiments, audio circuitry 810 also includes a headset jack (e.g., 912, FIG. 9). The headset jack provides an interface between audio circuitry 810 and removable audio input/output peripherals, such as output-only headphones or a headset with both output (e.g., a headphone for one or both ears) and input (e.g., a microphone).

I/O subsystem 806 couples input/output peripherals on device 800, such as touch screen 812 and other input control devices 816, to peripherals interface 818. I/O subsystem 806 may include display controller 856 and one or more input controllers 860 for other input or control devices. The one or more input controllers 860 receive/send electrical signals from/to other input or control devices 816. The other input control devices 816 may include physical buttons (e.g., push buttons, rocker buttons, etc.), dials, slider switches, joysticks, click wheels, and so forth. In some alternate embodiments, input controller(s) 860 may be coupled to any (or none) of the following: a keyboard, infrared port, USB port, and a pointer device such as a mouse. The one or more buttons (e.g., 908, FIG. 9) may include an up/down button for volume control of speaker 811 and/or microphone 813. The one or more buttons may include a push button (e.g., 906, FIG. 9).

Touch-sensitive display 812 provides an input interface and an output interface between the device and a user. Display controller 856 receives and/or sends electrical signals from/to touch screen 812. Touch screen 812 displays visual output to the user. The visual output may include graphics, text, icons, video, and any combination thereof (collectively termed "graphics"). In some embodiments, some or all of the visual output may correspond to user-interface objects.

Touch screen 812 has a touch-sensitive surface, sensor or set of sensors that accepts input from the user based on haptic and/or tactile contact. Touch screen 812 and display controller 856 (along with any associated modules and/or sets of instructions in memory 802) detect contact (and any movement or breaking of the contact) on touch screen 812 and converts the detected contact into interaction with user-interface objects (e.g., one or more soft keys, icons, web pages or images) that are displayed on touch screen 812. In an example embodiment, a point of contact between touch screen 812 and the user corresponds to a finger of the user.

Touch screen 812 may use LCD (liquid crystal display) technology, LPD (light emitting polymer display) technology, or LED (light emitting diode) technology, although other display technologies may be used in other embodiments. Touch screen 812 and display controller 856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 812. In an example embodiment, projected mutual capacitance sensing technology is used, such as that found in the iPhone®, iPod Touch®, and iPad® from Apple Inc. of Cupertino, Calif.

Touch screen 812 may have a video resolution in excess of 800 dpi. In some embodiments, the touch screen has a video resolution of approximately 860 dpi. The user may make contact with touch screen 812 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 812 or an extension of the touch-sensitive surface formed by the touch screen.

Device 800 also includes power system 862 for powering the various components. Power system 862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 800 may also include one or more optical sensors or cameras 864. FIG. 8 shows an optical sensor 864 coupled to optical sensor controller 858 in I/O subsystem 806. Optical sensor 864 may include charge-coupled device (CCD) or complementary metal-oxide semiconductor (CMOS) phototransistors. Optical sensor 864 receives light from the environment, projected through one or more lens, and converts the light to data representing an image. In conjunction with imaging module 843 (also called a camera module), optical sensor 864 may capture still images or video. In some embodiments, an optical sensor 864 is located on the back of device 800, opposite touch screen display 812 on the front of the device, so that the touch screen display 812 may be used as a viewfinder for still and/or video image acquisition. In some embodiments, another optical sensor is located on the front of the device so that the user's image may be obtained for videoconferencing while the user views the other video conference participants on the touch screen display.

Device 800 may also include one or more proximity sensors 866. FIG. 8 shows proximity sensor 866 coupled to peripherals interface 818. Alternately, proximity sensor 866 may be coupled to input controller 860 in I/O subsystem 806. In some embodiments, the proximity sensor 866 turns off and disables touch screen 812 when the multifunction device 800 is placed near the user's ear (e.g., when the user is making a phone call).

Device 800 includes one or more orientation sensors 868. In some embodiments, the one or more orientation sensors 868 include one or more accelerometers (e.g., one or more linear accelerometers and/or one or more rotational accelerometers). In some embodiments, the one or more orientation sensors 868 include one or more gyroscopes. In some embodiments, the one or more orientation sensors 868 include one or more magnetometers. In some embodiments, the one or more orientation sensors 868 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 800. In some embodiments, the one or more orientation sensors 868 include any combination of orientation/rotation sensors. FIG. 8 shows the one or more orientation sensors 868 coupled to peripherals interface 818. Alternatively, the one or more orientation sensors 868 may be coupled to an input controller 860 in I/O subsystem 806. In some embodiments, information is displayed on the touch screen display 812 in a portrait view or a landscape view based on an analysis of data received from the one or more orientation sensors 868.

In some embodiments, the software components stored in memory 802 include operating system 826, communication module (or set of instructions) 828, contact/motion module (or set of instructions) 830, graphics module (or set of instructions) 832, text input module (or set of instructions) 834, Global Positioning System (GPS) module (or set of instructions) 835, arbiter module 858 and applications (or sets of instructions) 836. Furthermore, in some embodiments memory 802 stores device/global internal state 857. Device/global internal state 857 includes one or more of: active application state, indicating which applications, if any, are currently active; display state, indicating what applications, views or other information occupy various regions of touch screen display 812; sensor state, including information obtained from the device's various sensors and input control devices 816; and location information concerning the device's location and/or attitude.

Operating system 826 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 828 facilitates communication with other devices over one or more external ports 824 and also includes various software components for handling data received by RF circuitry 508 and/or external port 824. External port 824 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 830 may detect contact with touch screen 812 (in conjunction with display controller 856) and other touch sensitive devices (e.g., a touchpad or physical click wheel). Contact/motion module 830 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 830 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 830 and display controller 856 detect contact on a touchpad.

Contact/motion module 830 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 832 includes various known software components for rendering and displaying graphics on touch screen 812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 832 stores data representing graphics to be used. Each graphic may be assigned a corresponding code. Graphics module 832 receives, from applications etc., one or more codes specifying graphics to be displayed along with, if necessary, coordinate data and other graphic property data, and then generates screen image data to output to display controller 856.

Text input module 834, which may be a component of graphics module 832, provides soft keyboards for entering text in various applications (e.g., contacts 837, e-mail 840, IM 841, browser 847, and any other application that needs text input).

GPS module 835 determines the location of the device and provides this information for use in various applications (e.g., to telephone 838 for use in location-based dialing, to camera 843 as picture/video metadata, and to applications that provide location-based services such as weather widgets, local yellow page widgets, and map/navigation widgets).

Applications 836 may include the following modules (or sets of instructions), or a subset or superset thereof:
- contacts module 837 (sometimes called an address book or contact list);
- telephone module 838;
- video conferencing module 839;
- e-mail client module 840;
- instant messaging (IM) module 841;
- workout support module 842;
- camera module 843 for still and/or video images;
- image management module 844;
- browser module 847;
- calendar module 848;
- widget modules 849, which may include one or more of: weather widget 849-1, stocks widget 849-2, calculator widget 849-3, alarm clock widget 849-4, dictionary widget 849-5, and other widgets obtained by the user, as well as user-created widgets 849-6;
- widget creator module 850 for making user-created widgets 849-6;
- search module 851;
- video and music player module 852, which may be made up of a video player module and a music player module;
- notes module 853;
- map module 854; and/or
- online video module 855.

Examples of other applications 836 that may be stored in memory 802 include other word processing applications, other image editing applications, drawing applications, presentation applications, JAVA-enabled applications, encryption, digital rights management, voice recognition, and voice replication.

In conjunction with touch screen 812, display controller 856, contact module 830, graphics module 832, and text input module 834, contacts module 837 may be used to manage an address book or contact list (e.g., stored in application internal state 857), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 838, video conference 839, e-mail 840, or IM 841; and so forth.

In conjunction with RF circuitry 808, audio circuitry 810, speaker 811, microphone 813, touch screen 812, display controller 856, contact module 830, graphics module 832, and text input module 834, telephone module 838 may be used to enter a sequence of characters corresponding to a telephone number, access one or more telephone numbers in address book 837, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 808, audio circuitry 810, speaker 811, microphone 813, touch screen 812, display controller 856, optical sensor 864, optical sensor controller 858, contact module 830, graphics module 832, text input module 834, contact list 837, and telephone module 838, videoconferencing module 839 includes executable instructions to initiate, conduct, and terminate a video conference between a user and one or more other participants in accordance with user instructions.

In conjunction with RF circuitry 808, touch screen 812, display controller 856, contact module 830, graphics module 832, and text input module 834, e-mail client module 840 includes executable instructions to create, send, receive, and manage e-mail in response to user instructions. In conjunction with image management module 844, e-mail client module 840 makes it very easy to create and send e-mails with still or video images taken with camera module 843.

In conjunction with RF circuitry 808, touch screen 812, display controller 856, contact module 830, graphics module 832, and text input module 834, the instant messaging module 841 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 808, touch screen 812, display controller 856, contact module 830, graphics module 832, text input module 834, GPS module 835, map module 854, and music player module 846, workout support module 842 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 812, display controller 856, optical sensor(s) 864, optical sensor controller 858, contact module 830, graphics module 832, and image management module 844, camera module 843 includes executable instructions to capture still images or video (including a video stream) and store them into memory 802, modify characteristics of a still image or video, or delete a still image or video from memory 802.

In conjunction with touch screen 812, display controller 856, contact module 830, graphics module 832, text input module 834, and camera module 843, image management module 844 includes executable instructions to arrange, modify (e.g., edit), or otherwise manipulate, label, delete, present (e.g., in a digital slide show or album), and store still and/or video images.

In conjunction with RF circuitry 808, touch screen 812, display system controller 856, contact module 830, graphics module 832, and text input module 834, browser module 847 includes executable instructions to browse the Internet in accordance with user instructions, including searching, linking to, receiving, and displaying web pages or portions thereof, as well as attachments and other files linked to web pages.

In conjunction with RF circuitry 808, touch screen 812, display system controller 856, contact module 830, graphics module 832, text input module 834, e-mail client module 840, and browser module 847, calendar module 848 includes executable instructions to create, display, modify, and store calendars and data associated with calendars (e.g., calendar entries, to do lists, etc.) in accordance with user instructions.

In conjunction with RF circuitry 808, touch screen 812, display system controller 856, contact module 830, graphics module 832, text input module 834, and browser module 847, widget modules 849 are mini-applications that may be downloaded and used by a user (e.g., weather widget 549-1, stocks widget 549-2, calculator widget 8493, alarm clock widget 849-4, and dictionary widget 849-5) or created by the user (e.g., user-created widget 849-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 808, touch screen 812, display system controller 856, contact module 830, graphics module 832, text input module 834, and browser module 847, the widget creator module 850 may be used by a user to create widgets (e.g., turning a user-specified portion of a web page into a widget).

In conjunction with touch screen 812, display system controller 856, contact module 830, graphics module 832, and text input module 834, search module 851 includes executable instructions to search for text, music, sound, image, video, and/or other files in memory 802 that match one or more search criteria (e.g., one or more user-specified search terms) in accordance with user instructions.

In conjunction with touch screen 812, display system controller 856, contact module 830, graphics module 832, audio circuitry 810, speaker 811, RF circuitry 808, and browser module 847, video and music player module 852 includes executable instructions that allow the user to download and play back recorded music and other sound files stored in one or more file formats, such as MP3 or AAC files, and executable instructions to display, present or otherwise play back videos (e.g., on touch screen 812 or on an external, connected display via external port 824). In some embodiments, device 800 may include the functionality of an MP3 player.

In conjunction with touch screen 812, display controller 856, contact module 830, graphics module 832, and text input module 834, notes module 853 includes executable instructions to create and manage notes, to do lists, and the like in accordance with user instructions.

In conjunction with RF circuitry 808, touch screen 812, display system controller 856, contact module 830, graphics module 832, text input module 834, GPS module 835, and browser module 847, map module 854 may be used to receive, display, modify, and store maps and data associated with maps (e.g., driving directions; data on stores and other points of interest at or near a particular location; and other location-based data) in accordance with user instructions.

In conjunction with touch screen 812, display system controller 856, contact module 830, graphics module 832, audio circuitry 810, speaker 811, RF circuitry 808, text input module 834, e-mail client module 840, and browser module 847, online video module 855 includes instructions that allow the user to access, browse, receive (e.g., by streaming and/or download), play back (e.g., on the touch screen or on an external, connected display via external port 824), send an e-mail with a link to a particular online video, and otherwise manage online videos in one or more file formats, such as H.264. In some embodiments, instant messaging module 841, rather than e-mail client module 840, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 802 may store a subset of the modules and data structures identified above. Furthermore, memory 802 may store additional modules and data structures not described above.

In some embodiments, device 800 is a device where operation of a predefined set of functions on the device is performed exclusively through a touch screen and/or a touchpad. By using a touch screen and/or a touchpad as the primary input control device for operation of device 800, the number of physical input control devices (such as push buttons, dials, and the like) on device 800 may be reduced.

The predefined set of functions that may be performed exclusively through a touch screen and/or a touchpad include navigation between user interfaces. In some embodiments, the touchpad, when touched by the user, navigates device 800 to a main, home, or root menu from any user interface that may be displayed on device 800. In such embodiments, the touchpad may be referred to as a "menu button." In some other embodiments, the menu button may be a physical push button or other physical input control device instead of a touchpad.

Figure 9:
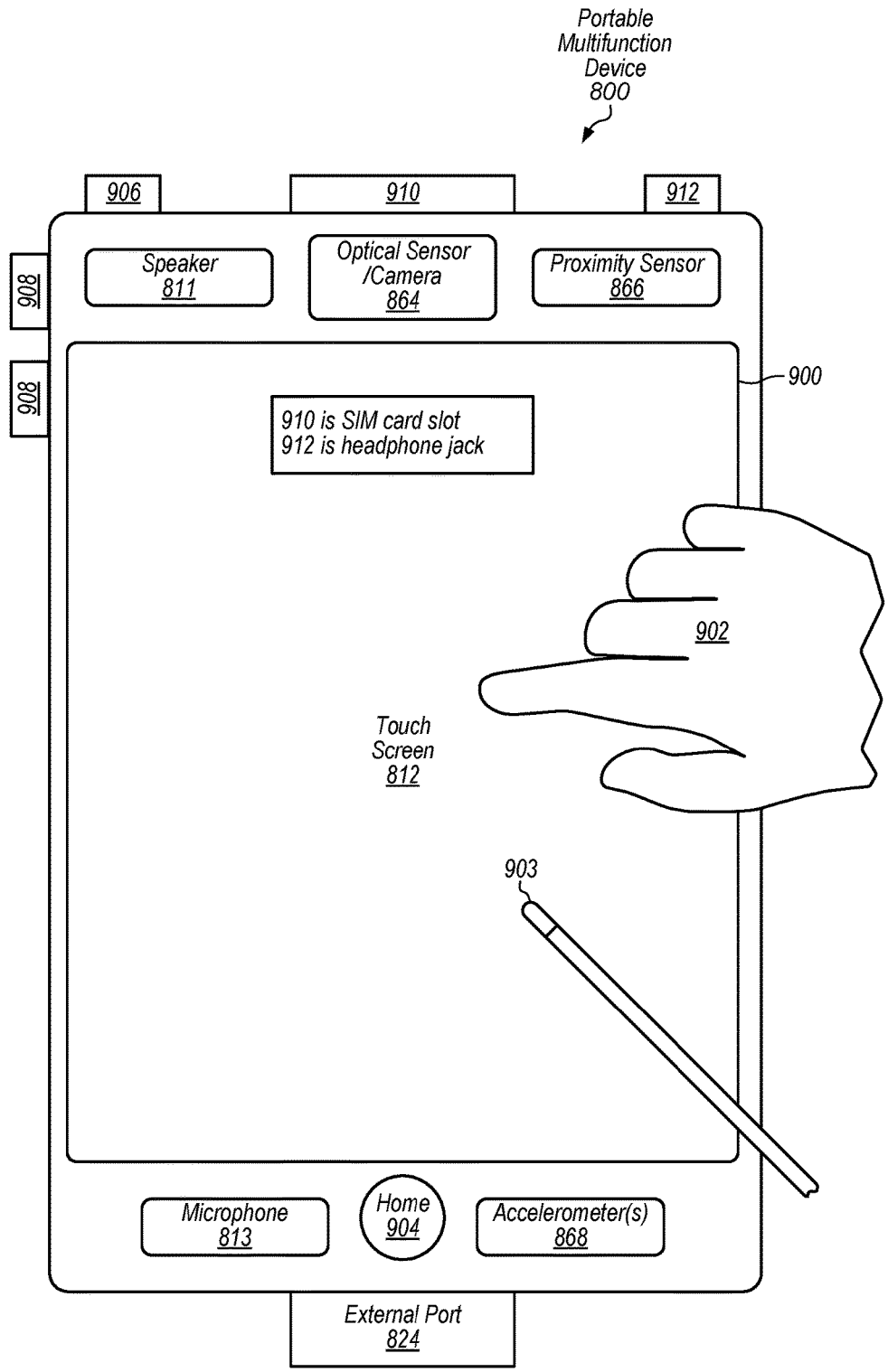
FIG. 9 depicts illustrates an example portable multifunction device that may include a position sensor configuration that compensates for a bias field offset, in accordance with some embodiments.

FIG. 9 illustrates a portable multifunction device 800 having a touch screen 812 in accordance with some embodiments. The touch screen 812 may display one or more graphics within user interface (UI) 900. In this embodiment, as well as others described below, a user may select one or more of the graphics by making a gesture on the graphics, for example, with one or more fingers 902 (not drawn to scale in the figure) or one or more styluses 903 (not drawn to scale in the figure).

Device 800 may also include one or more physical buttons, such as "home" or menu button 904. As described previously, menu button 904 may be used to navigate to any application 836 in a set of applications that may be executed on device 800. Alternatively, in some embodiments, the menu button 904 is implemented as a soft key in a GUI displayed on touch screen 812.

In one embodiment, device 800 includes touch screen 812, menu button 904, push button 906 for powering the device on/off and locking the device, volume adjustment button(s) 908, Subscriber Identity Module (SIM) card slot 910, head set jack 912, and docking/charging external port 824. Push button 906 may be used to turn the power on/off on the device by depressing the button and holding the button in the depressed state for a predefined time interval;

to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

It should be noted that, although many of the examples herein are given with reference to optical sensor/camera 864 (on the front of a device), a rear-facing camera or optical sensor that is pointed opposite from the display may be used instead of or in addition to an optical sensor/camera 864 on the front of a device.

Example Computer System

Figure 10:
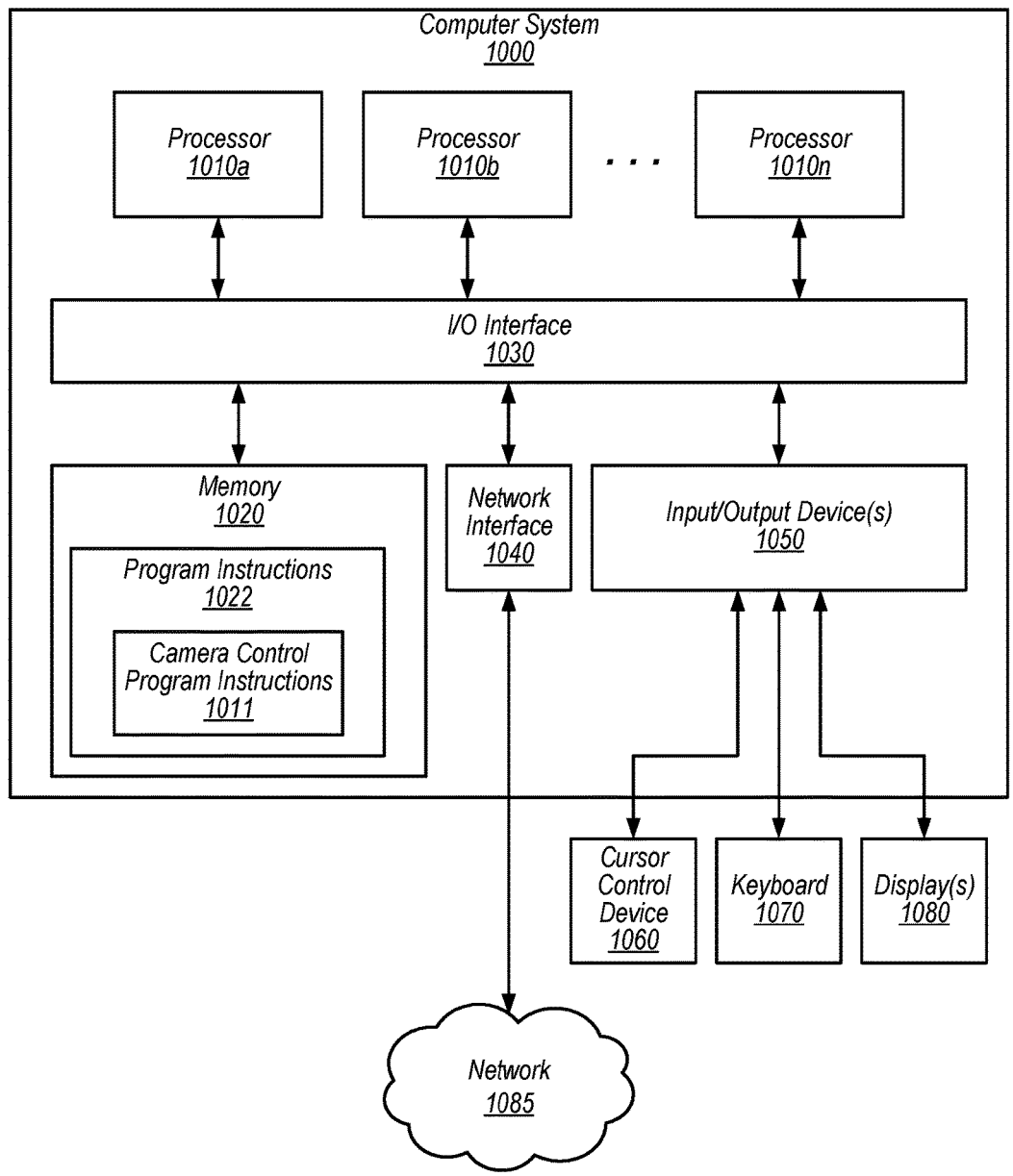
FIG. 10 illustrates an example computer system that may include a position sensor configuration that compensates for a bias field offset, according to some embodiments.

FIG. 10 illustrates an example computer system 1000 that may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store camera control program instructions 1022 and/or camera control data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement a lens control application 1024 incorporating any of the functionality described above. Additionally, existing camera control data 1032 of memory 1020 may include any of the information or data structures described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera unit, comprising:
   an optical package including one or more lenses that define an optical axis; and
   an asymmetric magnet arrangement for voice coil motor (VCM) actuation along the optical axis and along a plane that is orthogonal to the optical axis, the asymmetric magnet arrangement configured to produce an asymmetric magnetic field;
   position sensor magnets coupled to the optical package, wherein the position sensor magnets include a first position sensor magnet and a second position sensor magnet;
   a first magnetic field sensor package, including:
      a first magnetic field sensor configured to detect one or more magnetic field components to enable determination of a position, along the optical axis, of the optical package, wherein the one or more magnetic field components include at least one magnetic field component produced by the first position sensor magnet; and
      a first set of compensation magnets configured to contribute to one or more compensation magnetic fields that counteract a first bias field component that is offset, relative to a first axis that is orthogonal to the optical axis, based at least in part on the asymmetric magnetic field of the asymmetric magnet arrangement;
   a second magnetic field sensor package, including:
      a second magnetic field sensor configured to detect one or more magnetic field components to enable determination of the position, along the optical axis, of the optical package, wherein the one or more magnetic field components include at least one magnetic field component produced by the second position sensor magnet; and
      a second set of compensation magnets configured to contribute to one or more compensation magnetic fields that counteract a second bias field component that is offset, relative to a second axis that is orthogonal to the optical axis, based at least in part on the asymmetric magnetic field of the asymmetric magnet arrangement.

2. The camera unit of claim 1, wherein:
   the first bias field component comprises a first magnetic flux vector at the first magnetic field sensor;
   the second bias field component comprises a second magnetic flux vector at the second magnetic field sensor;
   a combination of the one or more compensation magnetic fields of the first set of compensation magnets comprises a third magnetic flux vector that cancels out the first magnetic flux vector at the first magnetic field sensor; and
   a combination of the one or more compensation magnetic fields of the second set of compensation magnets comprises a fourth magnetic flux vector that cancels out the second magnetic flux vector at the second magnetic field sensor.

3. The camera unit of claim 1, wherein:
at least one of the first magnetic field sensor or the second magnetic field sensor has an elongated shape with a long dimension that is longer than other dimensions of the elongated shape.

4. The camera unit of claim 1, wherein:
the first magnetic field sensor has a first elongated shape with a first long dimension that is longer than other dimensions of the first magnetic field sensor;
the second magnetic field sensor has a second elongated shape with a second long dimension that is longer than other dimensions of the second magnetic field sensor;
the first magnetic field sensor is oriented such that the first long dimension is parallel to the first axis that is orthogonal to the optical axis; and
the second magnetic field sensor is oriented such that the second long dimension is parallel to the second axis that is orthogonal to the optical axis.

5. The camera unit of claim 4, wherein:
the first bias field component comprises a first magnetic flux vector that points in a first direction;
the second bias field component comprises a second magnetic flux vector that points in the first direction;
the first magnetic field sensor is oriented such that the first long dimension extends along a second direction that is orthogonal to the first direction of the first bias field component; and
the second magnetic field sensor is oriented such that the second long dimension extends along the second direction that is orthogonal to the first direction of the second bias field component.

6. The camera unit of claim 1, wherein:
the first set of compensation magnets includes:
    a first compensation magnet coupled to a first side of the first magnetic field sensor; and
    a second compensation magnet coupled to a second side of the first magnetic field sensor, the second side being opposite the first side; and
the second set of compensation magnets includes:
    a first compensation magnet coupled to a first side of the second magnetic field sensor; and
    a second compensation magnet coupled to a second side of the second magnetic field sensor, the second side being opposite the first side.

7. The camera unit of claim 1, wherein:
the camera unit is rectangular in plan; and
the asymmetric magnet arrangement includes:
    a first magnet disposed proximate a first side of the camera unit;
    a second magnet disposed proximate a second side of the camera unit; and
    a third magnet disposed proximate a third side of the camera unit, the third side opposite the second side;
no actuator magnets are disposed proximate a fourth side of the camera unit, the fourth side opposite the first side.

8. The camera unit of claim 1, wherein:
the first magnetic field sensor includes at least one of a Hall sensor, a tunneling magnetoresistance (TMR) sensor, or a giant magnetoresistance (GMR) sensor; and
the second magnetic field sensor includes at least one of a Hall sensor, a TMR sensor, or a GMR sensor.

9. A mobile multifunction device, comprising:
one or more actuator magnets for voice coil motor (VCM) actuation of a movable member along a first axis and along a plane that is orthogonal to the first axis, the one or more actuator magnets producing an asymmetric magnetic field;
position sensor magnets coupled to the movable member;
magnetic field sensor packages, individual ones of the magnetic field sensor packages including:
    a respective magnetic field sensor configured to detect one or more magnetic field components to enable determination of a position, along the first axis, of the movable member, wherein the one or more magnetic field components include at least one magnetic field component produced by at least one of the position sensor magnets; and
    a respective set of one or more compensation magnets configured to contribute to one or more compensation magnetic fields that counteract a respective bias field component that is offset, relative to a second axis that is orthogonal to the first axis, based at least in part on the asymmetric magnetic field of the one or more actuator magnets.

10. The mobile multifunction device of claim 9, wherein:
the position sensor magnets include a first position sensor magnet and a second position sensor magnet; and
the magnetic field sensor packages include:
    a first magnetic field sensor package, including:
        a first magnetic field sensor configured to detect one or more magnetic field components that include at least one magnetic field component produced by the first position sensor magnet; and
        a first set of one or more compensation magnets configured to counteract a first bias field component that is offset relative to the second axis; and
    a second magnetic field sensor package, including:
        a second magnetic field sensor configured to detect one or more magnetic field components that include at least one magnetic field component produced by the second position sensor magnet; and
        a second set of one or more compensation magnets configured to counteract a second bias field component that is offset relative to the second axis.

11. The mobile multifunction device of claim 10, wherein:
the first magnetic field sensor has an elongated shape with a long dimension that is longer than other dimensions of the first magnetic field sensor;
the first bias field component comprises a first magnetic flux vector that points in a first direction; and
the first magnetic field sensor is oriented such that the long dimension extends along a second direction that is orthogonal to the first direction of the first bias field component.

12. The mobile multifunction device of claim 9, wherein:
the respective set of one or more compensation magnets includes:
    a first compensation magnet coupled to a first side of the respective magnetic field sensor; and
    a second compensation magnet coupled to a second side of the respective magnetic field sensor, the second side being opposite the first side.

13. The mobile multifunction device of claim 12, wherein:
the respective magnetic field sensor has an elongated shape with a long dimension that is longer than other dimensions of the respective magnetic field sensor; and
the first side and the second side of the respective magnetic field sensor extend along the long dimension.

14. The mobile multifunction device of claim 9, wherein:
the respective set of one or more compensation magnets includes at least one compensation magnet that is at least partially embedded within the respective magnetic field sensor.

15. The mobile multifunction device of claim 9, wherein:
the one or more actuator magnets comprise an asymmetric magnet arrangement, the asymmetric magnet arrangement including:
- a first magnet disposed proximate a first side of the movable member;
- a second magnet disposed proximate a second side of the movable member; and
- a third magnet disposed proximate a third side of the movable member, the third side opposite the second side; and
no actuator magnets are disposed proximate a fourth side of the movable member, the fourth side opposite the first side.

16. The mobile multifunction device of claim 15, further comprising:
an optical package of a camera module, the optical package coupled to the movable member and disposed proximate a top side of the movable member; and
a base structure disposed proximate a bottom side of the movable member, the bottom side opposite the top side;
wherein:
the position sensor magnets include:
- a first position sensor magnet disposed proximate the second side of the movable member; and
- a second position sensor disposed proximate the third side of the movable member, the third side opposite the second side;
the magnetic field sensor packages include:
- a first magnetic field sensor package coupled to the base structure and disposed proximate the first position sensor magnet; and
- a second magnetic field sensor package coupled to the base structure and disposed proximate the second position sensor magnet; and
the movable member is configured to move relative to the base structure in response to VCM actuation.

17. The mobile multifunction device of claim 9, wherein:
the respective magnetic field sensor includes at least one of a Hall sensor, a tunneling magnetoresistance (TMR) sensor, or a giant magnetoresistance (GMR) sensor.

18. A system, comprising:
one or more processors;
an optical package including one or more lenses that define an optical axis;
a voice coil motor (VCM) actuator for moving the optical package, wherein the VCM actuator includes a magnet arrangement for actuation along the optical axis and along a plane that is orthogonal to the optical axis, and the magnet arrangement is configured to produce an asymmetric magnetic field;
position sensor magnets coupled to the optical package, wherein the position sensor magnets include a first position sensor magnet and a second position sensor magnet;
magnetic field sensor packages, individual ones of the magnetic field sensor packages including:
- a respective magnetic field sensor configured to detect one or more magnetic field components that include at least one magnetic field component produced by at least one of the position sensor magnets; and
- a respective set of one or more compensation magnets configured to contribute to one or more compensation magnetic fields that counteract a respective bias field component that is offset, relative to an axis that is orthogonal to the optical axis, based at least in part on the asymmetric magnetic field of the magnet arrangement of the VCM actuator;
memory comprising program instructions that, when executed by the one or more processors, cause the one or more processors to:
- determine a first signal detected at a first magnetic field sensor of a first magnetic field sensor package of the magnetic field sensor packages, the first signal based at least in part on one or more magnetic fields produced by the first position sensor;
- determine a second signal detected at a second magnetic field sensor of a second magnetic field sensor package of the magnetic field sensor packages, the second signal based at least in part on one or more magnetic fields produced by the second position sensor; and
- calculate a first position of the optical package based at least in part on the first signal and the second signal.

19. The system of claim 18, wherein:
the first magnetic field sensor package includes:
- the first magnetic field sensor; and
- a first compensation magnet coupled to a first side of the first magnetic field sensor; and
- a second compensation magnet coupled to a second side of the first magnetic field sensor, the second side being opposite the first side; and
the second magnetic field sensor package includes:
- the second magnetic field sensor;
- a first compensation magnet coupled to a first side of the second magnetic field sensor; and
- a second compensation magnet coupled to a second side of the second magnetic field sensor, the second side being opposite the first side.

20. The system of claim 18, wherein:
the VCM actuator further includes:
- one or more autofocus coils for actuation along the optical axis via magnetic interaction with one or more actuator magnets of the magnet arrangement; and
- one or more optical image stabilization coils for actuation along the plane that is orthogonal to the optical axis via magnetic interaction with one or more actuator magnets of the magnet arrangement; and
the program instructions, when executed by the one or more processors, further cause the one or more processors to:
- determine, based at least in part on the first position, an adjustment to at least one of a voltage or a current supplied to at least one of the one or more autofocus coils to cause the optical package to move to a second position that is different than the first position.

* * * * *